(12) United States Patent
Soll et al.

(10) Patent No.: US 6,195,936 B1
(45) Date of Patent: Mar. 6, 2001

(54) METHOD FOR UPTAKE OF A SUBSTANCE INTO A SEED

(75) Inventors: David R. Soll; Karla J. Daniels; Donovan P. Gibson; Christine E. Taliga, all of Iowa City; John D. Shors, Des Moines, all of IA (US)

(73) Assignee: University of Iowa Research Foundation, Iowa City, IA (US)

( * ) Notice: Subject to any disclaimer, the term of this patent is extended or adjusted under 35 U.S.C. 154(b) by 0 days.

(21) Appl. No.: 09/255,618

(22) Filed: Feb. 22, 1999

(51) Int. Cl.[7] ............................... A01C 1/00; A01C 1/06
(52) U.S. Cl. .............................................. 47/57.6; 47/58.1
(58) Field of Search ..................................... 47/57.6, 58.1

(56) References Cited

U.S. PATENT DOCUMENTS

| | | |
|---|---|---|
| 3,307,289 | 3/1967 | Lemm . |
| 3,499,436 | 3/1970 | Balmuth . |
| 3,703,051 | 11/1972 | Weinberger . |
| 3,902,273 | 9/1975 | Friedman . |
| 4,018,755 * | 4/1977 | Wang ................................ 260/123.5 |
| 4,055,915 | 11/1977 | Charnoe . |
| 4,065,875 | 1/1978 | Srna . |
| 4,173,651 | 11/1979 | Muramoto et al. . |
| 4,211,744 | 7/1980 | Boucher . |
| 4,292,322 | 9/1981 | Muramoto . |
| 4,602,716 * | 7/1986 | Barla-Szabo et al. ................ 209/599 |
| 4,624,805 * | 11/1986 | Lawhorn .............................. 530/276 |

(List continued on next page.)

FOREIGN PATENT DOCUMENTS

| | | |
|---|---|---|
| 70008604 * | 9/1966 | (JP) . |
| 54-008604 * | 3/1970 | (JP) . |
| 62-215501 * | 9/1987 | (JP) . |
| 09065711 * | 8/1995 | (JP) . |
| 09140220 * | 6/1997 | (JP) . |
| 10179174 * | 7/1998 | (JP) . |
| 1047416 * | 10/1983 | (SU) . |
| 2001074 C1 * | 10/1993 | (SU) . |
| WO91/00358 * | 1/1991 | (WO) . |
| WO91/11904 * | 8/1991 | (WO) . |
| WO96/23528 * | 8/1996 | (WO) . |

OTHER PUBLICATIONS

Weinberger, P., Anderson, P., and Donnovan, L.C., Changes in Production, Yield, and Chemical Composition of Corn (*Zea Mays*) After Ultrasound Treatmnet of the Seeds, 1979, 81–88, No. 16, Springer–Verlag, Berkshire.

Sarukhanov, G.G., Avsnerich, I.A., and Astroshenko, L.A., USSR Author's Certificate No. 578027, 1975, 01 c 1/00, C.L. A., Union of Soviet Socialist Republics.

Seed Germination Propulsion Apparatus–Includes Light Source to Propel Seed Germination by Intermittently Irradiating Light To Seedling, 1997, Derwent Information Ltd.

Anthocyanin Dye Extn. From Plant Materials–By Applying Ultrasonic, 1999, Derwent Information Ltd.

Yamaguchi, M., Tranformation of Plant and Production of Transgenic Plant, 1998.

(List continued on next page.)

Primary Examiner—Michael J. Carone
Assistant Examiner—Jeffrey L. Gellner
(74) Attorney, Agent, or Firm—Daniel A. Rosenberg; Kent A. Herink; Davis, Brown Law Firm

(57) ABSTRACT

A method of enhancing a growth characteristic of seed by immersing the seed in an aqueous solution including dissolved inert gas and sonicating the seed at a frequency preferably of between about 15 kHz and about 30 kHz and an energy density of between about 1 watt/cm$^2$ and about 10 watts/cm$^2$ for a period of between 1 minute and about 15 minutes. The sonicated seed exhibits an enhanced growth characteristic including resistance to pests and growth properties consistent with the introduction of essential nutrients. Plants grown from the treated seeds exhibit improved characteristics.

4 Claims, 28 Drawing Sheets

U.S. PATENT DOCUMENTS

| | | |
|---|---|---|
| 4,671,254 | 6/1987 | Fair . |
| 4,680,889 | 7/1987 | Carlson . |
| 4,834,789 | 5/1989 | Carlson . |
| 5,003,965 | 4/1991 | Talish et al. . |
| 5,048,520 | 9/1991 | Vago . |
| 5,065,761 | 11/1991 | Pell . |
| 5,143,063 | 9/1992 | Fellner . |
| 5,158,070 | 10/1992 | Dory . |
| 5,209,221 | 5/1993 | Riedlinger . |
| 5,219,401 | 6/1993 | Cathignol et al. . |
| 5,271,470 | 12/1993 | King et al. . |
| 5,295,484 | 3/1994 | Marcus et al. . |
| 5,305,737 | 4/1994 | Vago . |
| 5,358,725 * | 10/1994 | Izumitani et al. .................... 426/238 |
| 5,380,411 | 1/1995 | Schlief . |
| 5,383,459 | 1/1995 | Iwama et al. . |
| 5,431,621 | 7/1995 | Dory . |
| 5,498,431 | 3/1996 | Lindner . |
| 5,731,265 | 3/1998 | Hou et al. . |
| 5,950,362 * | 9/1999 | Shors et al. ............................... 47/61 |

OTHER PUBLICATIONS

Jorsbore, M., A Method for Introducing Molecules, Particularly Genetic Material, Into Plant Cells, 1991.

Wilhelm, E., Process for Disinfecting Plants and Plant Tissues, 1996.

Kajita, T., Promotion of Growth of Rice Plant Seed, 1987.

Ronnqvist, H., A Method and Device For The Pollination of Plants, 1991.

Yazaki, Gel Coated Seed Germination–Involves Subjecting Coated Seed to Ultrasonic Vibration After Soaking it in Aqueous Hydrogen Peroxide, 1997.

Imamaliev, A., Seed Pre–Sowing Treatment Process–By Exposing to Ultrasound Until Seed Buoyancy Is Destroyed to Improve Quality, 1983, Derwent Information Ltd.

Ishiwatari, S. Ultrasonic Wave Irradation Treatment Method for Seed Germination Acceleration, 1970, Japan.

I.D. Rubtsova, Effect of Ultrasound on the Germination of the Seeds and on Productivity of Fodder Beans, Sep. 27, 1965, Biofizika 12: No. 3, Tambov Pedagogical Institute.

Alan E. Crawford, The Application of High Intensity Sound for the Stimulation of Plant Growth, Proceedings of the Institute of Acoustics, Aug. 1, 1989, 81–88, Springer–Verlag, Berkshire.

* cited by examiner

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT INCREASE IN WEIGHT OF SONICATED SEED | CONTROL SEED WEIGHT BEFORE SOAKING (mg) | CONTROL SEED WEIGHT POST SOAKING (mg) | CONTROL SEED WEIGHT DIFFERENCE | PERCENT INCREASE IN WEIGHT OF SOAKED SEED (CONTROL) |
|---|---|---|---|---|---|---|---|---|
| 1 | 267 | 305 | 38 | 14.2% | 302 | 314 | 12 | 4.0% |
| 2 | 277 | 329 | 52 | 18.8% | 229 | 246 | 17 | 7.4% |
| 3 | 267 | 337 | 70 | 26.2% | 291 | 313 | 22 | 7.6% |
| 4 | 281 | 335 | 54 | 19.2% | 286 | 300 | 14 | 4.9% |
| 5 | 259 | 310 | 51 | 19.7% | 274 | 289 | 15 | 5.5% |
| 6 | 245 | 311 | 66 | 26.9% | 311 | 324 | 13 | 4.2% |
| 7 | 293 | 343 | 50 | 17.1% | 323 | 353 | 30 | 9.3% |
| 8 | 274 | 323 | 49 | 17.9% | 246 | 256 | 10 | 4.1% |
| 9 | 300 | 360 | 60 | 20.0% | 283 | 327 | 44 | 15.5% |
| 10 | 287 | 328 | 41 | 14.3% | 283 | 296 | 13 | 4.6% |
| 11 | 269 | 313 | 44 | 16.4% | 279 | 295 | 16 | 5.7% |
| 12 | 223 | 291 | 68 | 30.5% | 290 | 320 | 30 | 10.3% |
| 13 | 247 | 300 | 53 | 21.5% | 312 | 334 | 22 | 7.1% |
| 14 | 268 | 330 | 62 | 23.1% | 328 | 347 | 19 | 5.8% |
| 15 | 247 | 283 | 36 | 14.6% | 255 | 283 | 28 | 11.0% |
| 16 | 312 | 387 | 75 | 24.0% | 263 | 279 | 16 | 6.1% |
| 17 | 260 | 289 | 29 | 11.2% | 261 | 272 | 11 | 4.2% |
| 18 | 276 | 318 | 42 | 15.2% | 237 | 248 | 11 | 4.6% |
| 19 | 276 | 330 | 54 | 19.6% | 258 | 274 | 16 | 6.2% |
| 20 | 301 | 356 | 55 | 18.3% | 244 | 255 | 11 | 4.5% |
| MEAN: | 271.5 | 323.9 | 52.5 | 19.4% | 277.8 | 296.3 | 18.5 | 6.6% |
| STDDEV: | 21.5 | 25.7 | 12.1 | 4.8% | 28.6 | 32.4 | 8.7 | 3.0% |

Fig. 2

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT INCREASE IN WEIGHT OF SONICATED SEED | CONTROL SEED WEIGHT BEFORE SOAKING (mg) | CONTROL SEED WEIGHT POST SOAKING (mg) | CONTROL SEED WEIGHT DIFFERENCE | PERCENT INCREASE IN WEIGHT OF SOAKED SEED (CONTROL) |
|---|---|---|---|---|---|---|---|---|
| 1 | 276 | 313 | 37 | 13.4% | 196 | 206 | 10 | 5.1% |
| 2 | 194 | 233 | 39 | 20.1% | 225 | 237 | 12 | 5.3% |
| 3 | 189 | 222 | 33 | 17.5% | 257 | 272 | 15 | 5.8% |
| 4 | 248 | 282 | 34 | 13.7% | 269 | 285 | 16 | 5.9% |
| 5 | 246 | 297 | 51 | 20.7% | 217 | 226 | 9 | 4.1% |
| 6 | 270 | 318 | 48 | 17.8% | 237 | 249 | 12 | 5.1% |
| 7 | 211 | 248 | 37 | 17.5% | 262 | 276 | 14 | 5.3% |
| 8 | 156 | 188 | 32 | 20.5% | 261 | 284 | 23 | 8.8% |
| 9 | 282 | 316 | 34 | 12.1% | 187 | 204 | 17 | 9.1% |
| 10 | 203 | 239 | 36 | 17.7% | 209 | 223 | 14 | 6.7% |
| 11 | 276 | 338 | 62 | 22.5% | 134 | 145 | 11 | 8.2% |
| 12 | 218 | 256 | 38 | 17.4% | 194 | 208 | 14 | 7.2% |
| 13 | 256 | 304 | 48 | 18.8% | 223 | 236 | 13 | 5.8% |
| 14 | 253 | 291 | 38 | 15.0% | 280 | 294 | 14 | 5.0% |
| 15 | 192 | 226 | 34 | 17.7% | 229 | 238 | 9 | 3.9% |
| MEAN: | 231.3 | 271.4 | 40.1 | 17.5% | 225.3 | 238.9 | 13.5 | 6.1% |
| STDDEV: | 39.1 | 44.2 | 8.4 | 2.9% | 38.4 | 39.9 | 3.5 | 1.6% |

Fig. 3

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT INCREASE IN WEIGHT OF SONICATED SEED | CONTROL SEED WEIGHT BEFORE SOAKING (mg) | CONTROL SEED WEIGHT POST SOAKING (mg) | CONTROL SEED WEIGHT DIFFERENCE | PERCENT INCREASE IN WEIGHT OF SOAKED SEED (CONTROL) |
|---|---|---|---|---|---|---|---|---|
| 1 | 229 | 263 | 34 | 14.8% | 273 | 315 | 42 | 15.4% |
| 2 | 324 | 358 | 34 | 10.5% | 273 | 281 | 8 | 2.9% |
| 3 | 298 | 355 | 57 | 19.1% | 287 | 301 | 14 | 4.9% |
| 4 | 250 | 318 | 68 | 27.2% | 279 | 290 | 11 | 3.9% |
| 5 | 266 | 340 | 74 | 27.8% | 294 | 308 | 14 | 4.8% |
| 6 | 248 | 304 | 56 | 22.6% | 305 | 319 | 14 | 4.6% |
| 7 | 268 | 327 | 59 | 22.0% | 323 | 362 | 39 | 12.1% |
| 8 | 265 | 303 | 38 | 14.3% | 249 | 261 | 12 | 4.8% |
| 9 | 265 | 313 | 48 | 18.1% | 268 | 282 | 14 | 5.2% |
| 10 | 286 | 326 | 40 | 14.0% | 248 | 260 | 12 | 4.8% |
| 11 | 284 | 320 | 36 | 12.7% | 267 | 282 | 15 | 5.6% |
| 12 | 285 | 340 | 55 | 19.3% | 320 | 352 | 32 | 10.0% |
| 13 | 283 | 322 | 39 | 13.8% | 252 | 266 | 14 | 5.6% |
| 14 | 298 | 335 | 37 | 12.4% | 249 | 263 | 14 | 5.6% |
| 15 | 304 | 336 | 32 | 10.5% | 274 | 286 | 12 | 4.4% |
| 16 | 283 | 321 | 38 | 13.4% | 243 | 257 | 14 | 5.8% |
| 17 | 231 | 294 | 63 | 27.3% | 250 | 263 | 13 | 5.2% |
| 18 | 282 | 336 | 54 | 19.1% | 272 | 286 | 14 | 5.1% |
| 19 | 288 | 328 | 40 | 13.9% | 265 | 290 | 25 | 9.4% |
| 20 | 330 | 356 | 26 | 7.9% | 299 | 327 | 28 | 9.4% |
| MEAN: | 278.4 | 324.8 | 46.4 | 17.0% | 274.5 | 292.6 | 18.1 | 6.5% |
| STDDEV: | 26.6 | 22.6 | 13.4 | 5.9% | 23.9 | 30.2 | 9.7 | 3.1% |

Fig. 4

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT INCREASE IN WEIGHT OF SONICATED SEED | CONTROL SEED WEIGHT BEFORE SOAKING (mg) | CONTROL SEED WEIGHT POST SOAKING (mg) | CONTROL SEED WEIGHT DIFFERENCE | PERCENT INCREASE IN WEIGHT OF SOAKED SEED (CONTROL) |
|---|---|---|---|---|---|---|---|---|
| 1 | 299 | 329 | 30 | 10.0% | 247 | 258 | 11 | 4.5% |
| 2 | 241 | 268 | 27 | 11.2% | 241 | 251 | 10 | 4.1% |
| 3 | 242 | 278 | 36 | 14.9% | 220 | 229 | 9 | 4.1% |
| 4 | 273 | 303 | 30 | 11.0% | 247 | 262 | 15 | 6.1% |
| 5 | 248 | 273 | 25 | 10.1% | 235 | 247 | 12 | 5.1% |
| 6 | 272 | 303 | 31 | 11.4% | 250 | 262 | 12 | 4.8% |
| 7 | 262 | 295 | 33 | 12.6% | 226 | 235 | 9 | 4.0% |
| 8 | 259 | 293 | 34 | 13.1% | 258 | 270 | 12 | 4.7% |
| 9 | 240 | 270 | 30 | 12.5% | 263 | 276 | 13 | 4.9% |
| 10 | 264 | 297 | 33 | 12.5% | 308 | 324 | 16 | 5.2% |
| 11 | 293 | 363 | 70 | 23.9% | 306 | 324 | 18 | 5.9% |
| 12 | 268 | 290 | 22 | 8.2% | 357 | 265 | 8 | 3.1% |
| 13 | 247 | 300 | 53 | 21.5% | 203 | 213 | 10 | 4.9% |
| 14 | 276 | 345 | 69 | 25.0% | 240 | 261 | 21 | 8.8% |
| 15 | 272 | 352 | 80 | 29.4% | 214 | 225 | 11 | 5.1% |
| 16 | 244 | 272 | 28 | 11.5% | 232 | 249 | 17 | 7.3% |
| 17 | 301 | 352 | 51 | 16.9% | 238 | 251 | 13 | 5.5% |
| 18 | 289 | 331 | 42 | 14.5% | 271 | 286 | 15 | 5.5% |
| 19 | 263 | 311 | 48 | 18.3% | 251 | 264 | 13 | 5.2% |
| 20 | 256 | 309 | 53 | 20.7% | 283 | 300 | 17 | 6.0% |
| MEAN: | 265.5 | 306.7 | 41.3 | 15.5% | 249.5 | 262.6 | 13.1 | 5.2% |
| STDDEV: | 19.2 | 29.6 | 16.6 | 5.8% | 27.3 | 29.2 | 3.4 | 1.2% |

Fig. 5

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT INCREASE IN WEIGHT OF SONICATED SEED | CONTROL SEED WEIGHT BEFORE SOAKING (mg) | CONTROL SEED WEIGHT POST SOAKING (mg) | CONTROL SEED WEIGHT DIFFERENCE | PERCENT INCREASE IN WEIGHT OF SOAKED SEED (CONTROL) |
|---|---|---|---|---|---|---|---|---|
| 1 | 122 | 155 | 33 | 27.0% | 123 | 133 | 10 | 8.1% |
| 2 | 174 | 214 | 40 | 23.0% | 100 | 108 | 8 | 8.0% |
| 3 | 139 | 172 | 33 | 23.7% | 124 | 139 | 15 | 12.1% |
| 4 | 138 | 178 | 40 | 29.0% | 127 | 142 | 15 | 11.8% |
| 5 | 142 | 175 | 33 | 23.2% | 162 | 177 | 15 | 9.3% |
| 6 | 148 | 193 | 45 | 30.4% | 128 | 140 | 12 | 9.4% |
| 7 | 132 | 170 | 38 | 28.8% | 150 | 174 | 24 | 16.0% |
| 8 | 132 | 176 | 44 | 33.3% | 140 | 161 | 21 | 15.0% |
| 9 | 127 | 157 | 30 | 23.6% | 189 | 207 | 18 | 9.5% |
| 10 | 114 | 140 | 26 | 22.8% | 122 | 134 | 12 | 9.8% |
| 11 | 139 | 190 | 51 | 36.7% | 118 | 131 | 13 | 11.0% |
| 12 | 131 | 163 | 32 | 24.4% | 141 | 156 | 15 | 10.6% |
| 13 | 170 | 206 | 36 | 21.2% | 117 | 128 | 11 | 9.4% |
| 14 | 122 | 155 | 33 | 27.0% | 99 | 110 | 11 | 11.1% |
| 15 | 186 | 251 | 65 | 34.9% | 142 | 158 | 16 | 11.3% |
| 16 | 94 | 137 | 43 | 45.7% | 145 | 157 | 12 | 8.3% |
| 17 | 155 | 199 | 44 | 28.4% | 154 | 173 | 19 | 12.3% |
| 18 | 163 | 196 | 33 | 20.2% | 117 | 130 | 13 | 11.1% |
| 19 | 118 | 150 | 32 | 27.1% | 174 | 191 | 17 | 9.8% |
| 20 | 161 | 197 | 36 | 22.4% | 175 | 189 | 14 | 8.0% |
| MEAN: | 140.4 | 178.7 | 38.4 | 27.7% | 137.4 | 151.9 | 14.6 | 10.6% |
| STDDEV: | 22.6 | 27.8 | 8.8 | 6.2% | 24.6 | 27.1 | 3.9 | 2.2% |

Fig. 6

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT INCREASE IN WEIGHT OF SONICATED SEED | CONTROL SEED WEIGHT BEFORE SOAKING (mg) | CONTROL SEED WEIGHT POST SOAKING (mg) | CONTROL SEED WEIGHT DIFFERENCE | PERCENT INCREASE IN WEIGHT OF SOAKED SEED (CONTROL) |
|---|---|---|---|---|---|---|---|---|
| 1 | 255 | 300 | 45 | 17.6% | 265 | 278 | 13 | 4.9% |
| 2 | 276 | 304 | 28 | 10.1% | 278 | 293 | 15 | 5.4% |
| 3 | 268 | 321 | 53 | 19.8% | 330 | 352 | 22 | 6.7% |
| 4 | 265 | 302 | 37 | 14.0% | 263 | 274 | 11 | 4.2% |
| 5 | 293 | 338 | 45 | 15.4% | 259 | 274 | 15 | 5.8% |
| 6 | 260 | 300 | 40 | 15.4% | 258 | 270 | 12 | 4.7% |
| 7 | 253 | 296 | 43 | 17.0% | 252 | 264 | 12 | 4.8% |
| 8 | 276 | 335 | 59 | 21.4% | 271 | 283 | 12 | 4.4% |
| 9 | 268 | 349 | 81 | 30.2% | 285 | 298 | 13 | 4.6% |
| 10 | 244 | 286 | 42 | 17.2% | 271 | 286 | 15 | 5.5% |
| 11 | 271 | 315 | 44 | 16.2% | 325 | 342 | 17 | 5.2% |
| 12 | 253 | 283 | 30 | 11.9% | 282 | 298 | 16 | 5.7% |
| 13 | 257 | 293 | 36 | 14.0% | 326 | 340 | 14 | 4.3% |
| 14 | 315 | 382 | 67 | 21.3% | 274 | 287 | 13 | 4.7% |
| 15 | 268 | 330 | 62 | 23.1% | 275 | 289 | 14 | 5.1% |
| 16 | 292 | 336 | 44 | 15.1% | 272 | 286 | 14 | 5.1% |
| 17 | 267 | 306 | 39 | 14.6% | 272 | 284 | 12 | 4.4% |
| 18 | 249 | 303 | 54 | 21.7% | 281 | 294 | 13 | 4.6% |
| 19 | 269 | 313 | 44 | 16.4% | 297 | 314 | 17 | 5.7% |
| 20 | 295 | 341 | 46 | 15.6% | 307 | 323 | 16 | 5.2% |
| 21 | 284 | 310 | 26 | 9.2% | 291 | 305 | 14 | 4.8% |
| MEAN: | 270.4 | 316.3 | 46.0 | 17.0% | 282.6 | 296.6 | 14.3 | 5.0% |
| STDDEV: | 17.6 | 24.1 | 13.2 | 4.7% | 22.6 | 24.5 | 2.5 | 0.6% |

*Fig. 7*

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT INCREASE IN WEIGHT OF SONICATED SEED | CONTROL SEED WEIGHT BEFORE SOAKING (mg) | CONTROL SEED WEIGHT POST SOAKING (mg) | CONTROL SEED WEIGHT DIFFERENCE | PERCENT INCREASE IN WEIGHT OF SOAKED SEED (CONTROL) |
|---|---|---|---|---|---|---|---|---|
| 1 | 276 | 306 | 30 | 10.9% | 306 | 320 | 14 | 4.6% |
| 2 | 286 | 353 | 67 | 23.4% | 287 | 314 | 27 | 9.4% |
| 3 | 288 | 331 | 43 | 14.9% | 287 | 303 | 16 | 5.6% |
| 4 | 314 | 359 | 45 | 14.3% | 282 | 297 | 15 | 5.3% |
| 5 | 265 | 316 | 51 | 19.2% | 261 | 273 | 12 | 4.6% |
| 6 | 227 | 288 | 61 | 26.9% | 249 | 296 | 47 | 18.9% |
| 7 | 292 | 330 | 38 | 13.0% | 304 | 320 | 16 | 5.3% |
| 8 | 277 | 337 | 60 | 21.7% | 296 | 315 | 19 | 6.4% |
| 9 | 246 | 285 | 39 | 15.9% | 340 | 353 | 13 | 3.8% |
| 10 | 274 | 314 | 40 | 14.6% | 283 | 296 | 13 | 4.6% |
| 11 | 274 | 350 | 76 | 27.7% | 333 | 348 | 15 | 4.5% |
| 12 | 281 | 359 | 78 | 27.8% | 261 | 292 | 31 | 11.9% |
| 13 | 272 | 309 | 37 | 13.6% | 240 | 251 | 11 | 4.6% |
| 14 | 256 | 288 | 32 | 12.5% | 297 | 311 | 14 | 4.7% |
| 15 | 308 | 350 | 42 | 13.6% | 281 | 295 | 14 | 5.0% |
| 16 | 272 | 330 | 58 | 21.3% | 239 | 250 | 11 | 4.6% |
| 17 | 298 | 357 | 59 | 19.8% | 285 | 299 | 14 | 4.9% |
| 18 | 304 | 355 | 51 | 16.8% | 307 | 320 | 13 | 4.2% |
| 19 | 286 | 338 | 52 | 18.2% | 264 | 277 | 13 | 4.9% |
| 20 | 268 | 333 | 65 | 24.3% | 273 | 291 | 18 | 6.6% |
| MEAN: | 278.2 | 329.4 | 51.2 | 18.5% | 283.8 | 301.1 | 17.3 | 6.2% |
| STDDEV: | 20.8 | 24.6 | 14.0 | 5.4% | 27.2 | 26.4 | 8.6 | 3.5% |

Fig. 8

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT INCREASE IN WEIGHT OF SONICATED SEED | CONTROL SEED WEIGHT BEFORE SOAKING (mg) | CONTROL SEED WEIGHT POST SOAKING (mg) | CONTROL SEED WEIGHT DIFFERENCE | PERCENT INCREASE IN WEIGHT OF SOAKED SEED (CONTROL) |
|---|---|---|---|---|---|---|---|---|
| 1 | 260 | 291 | 31 | 11.9% | 271 | 286 | 15 | 5.5% |
| 2 | 289 | 332 | 43 | 14.9% | 260 | 273 | 13 | 5.0% |
| 3 | 298 | 329 | 31 | 10.4% | 285 | 305 | 20 | 7.0% |
| 4 | 331 | 380 | 49 | 14.8% | 269 | 293 | 24 | 8.9% |
| 5 | 290 | 341 | 51 | 17.6% | 283 | 304 | 21 | 7.4% |
| 6 | 290 | 317 | 27 | 9.3% | 265 | 277 | 12 | 4.5% |
| 7 | 277 | 317 | 40 | 14.4% | 276 | 293 | 17 | 6.2% |
| 8 | 279 | 322 | 43 | 15.4% | 263 | 280 | 17 | 6.5% |
| 9 | 275 | 316 | 41 | 14.9% | 300 | 314 | 14 | 4.7% |
| 10 | 307 | 354 | 47 | 15.3% | 282 | 297 | 15 | 5.3% |
| 11 | 258 | 295 | 37 | 14.3% | 264 | 281 | 17 | 6.4% |
| 12 | 286 | 349 | 63 | 22.0% | 320 | 336 | 16 | 5.0% |
| 13 | 324 | 385 | 61 | 18.8% | 323 | 340 | 17 | 5.3% |
| 14 | 258 | 301 | 43 | 16.7% | 293 | 309 | 16 | 5.5% |
| 15 | 300 | 354 | 54 | 18.0% | 286 | 302 | 16 | 5.6% |
| 16 | 291 | 345 | 54 | 18.6% | 321 | 339 | 18 | 5.6% |
| 17 | 297 | 328 | 31 | 10.4% | 314 | 329 | 15 | 4.8% |
| 18 | 296 | 336 | 40 | 13.5% | 315 | 333 | 18 | 5.7% |
| 19 | 289 | 324 | 35 | 12.1% | 277 | 291 | 14 | 5.1% |
| 20 | 256 | 285 | 29 | 11.3% | 299 | 311 | 12 | 4.0% |
| MEAN: | 287.6 | 330.1 | 42.5 | 14.7% | 288.3 | 304.7 | 16.4 | 5.7% |
| STDDEV: | 20.4 | 26.8 | 10.5 | 3.3% | 21.2 | 21.5 | 3.0 | 1.1% |

Fig. 9

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT INCREASE IN WEIGHT OF SONICATED SEED | CONTROL SEED WEIGHT BEFORE SOAKING (mg) | CONTROL SEED WEIGHT POST SOAKING (mg) | CONTROL SEED WEIGHT DIFFERENCE | PERCENT INCREASE IN WEIGHT OF SOAKED SEED (CONTROL) |
|---|---|---|---|---|---|---|---|---|
| 1 | 296.2 | 345.4 | 49.2 | 16.6% | 285.4 | 299.2 | 13.8 | 4.8% |
| 2 | 287.6 | 336.6 | 49.0 | 17.0% | 281.4 | 294.7 | 13.3 | 4.7% |
| 3 | 298.6 | 345.8 | 47.2 | 15.8% | 284.5 | 300.8 | 16.3 | 5.7% |
| 4 | 289.6 | 325.3 | 35.7 | 12.3% | 290.9 | 307.7 | 16.8 | 5.8% |
| 5 | 281.6 | 319.7 | 38.1 | 13.5% | 288.3 | 303.0 | 14.7 | 5.1% |
| 6 | 284.9 | 341.0 | 56.1 | 19.7% | 280.8 | 296.1 | 15.3 | 5.4% |
| 7 | 284.6 | 329.7 | 45.1 | 15.8% | 284.0 | 299.9 | 15.9 | 5.6% |
| 8 | 295.4 | 335.9 | 40.5 | 13.7% | 289.5 | 304.0 | 14.6 | 5.0% |
| 9 | 284.2 | 331.0 | 46.8 | 16.5% | 302.7 | 318.1 | 15.4 | 5.1% |
| 10 | 291.2 | 341.5 | 50.3 | 17.3% | 289.7 | 304.4 | 14.7 | 5.1% |
| 11 | 288.0 | 341.9 | 53.9 | 18.7% | 285.3 | 298.5 | 13.3 | 4.6% |
| 12 | 280.3 | 325.3 | 45.0 | 16.1% | 287.2 | 303.3 | 16.2 | 5.6% |
| MEAN: | 288.5 | 334.9 | 46.4 | 16.1% | 287.5 | 302.5 | 15.0 | 5.2% |
| STDDEV: | 5.9 | 8.6 | 6.0 | 2.1% | 5.8 | 6.1 | 1.2 | 0.4% |

Fig. 10

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT INCREASE IN WEIGHT OF SONICATED SEED | CONTROL SEED WEIGHT BEFORE SOAKING (mg) | CONTROL SEED WEIGHT POST SOAKING (mg) | CONTROL SEED WEIGHT DIFFERENCE | PERCENT INCREASE IN WEIGHT OF SOAKED SEED (CONTROL) |
|---|---|---|---|---|---|---|---|---|
| 1 | 293.7 | 331.3 | 37.7 | 12.8% | 282.8 | 297.1 | 14.3 | 5.1% |
| 2 | 285.7 | 327.8 | 42.1 | 14.7% | 303.3 | 315.3 | 12.1 | 4.0% |
| 3 | 295.9 | 346.4 | 50.5 | 17.1% | 288.3 | 302.1 | 13.8 | 4.8% |
| 4 | 294.6 | 330.2 | 35.6 | 12.1% | 285.9 | 300.6 | 14.7 | 5.1% |
| 5 | 303.2 | 332.0 | 28.8 | 9.5% | 296.4 | 312.1 | 15.8 | 5.3% |
| 6 | 296.3 | 325.5 | 29.1 | 9.8% | 283.5 | 298.7 | 15.2 | 5.4% |
| 7 | 296.7 | 327.4 | 30.7 | 10.3% | 292.3 | 308.0 | 15.7 | 5.4% |
| 8 | 293.7 | 326.2 | 32.5 | 11.1% | 296.2 | 310.9 | 14.7 | 5.0% |
| 9 | 286.9 | 321.9 | 35.0 | 12.2% | 294.0 | 308.0 | 14.0 | 4.8% |
| 10 | 299.4 | 332.1 | 32.7 | 10.9% | 289.7 | 303.2 | 13.5 | 4.7% |
| 11 | 301.0 | 336.8 | 35.8 | 11.9% | 299.2 | 315.7 | 16.5 | 5.5% |
| 12 | 281.8 | 322.9 | 41.1 | 14.6% | 293.4 | 308.4 | 15.0 | 5.1% |
| MEAN: | 294.1 | 330.0 | 36.0 | 12.3% | 292.1 | 306.6 | 14.6 | 5.0% |
| STDDEV: | 6.4 | 6.7 | 6.2 | 2.2% | 6.3 | 6.3 | 1.2 | 0.4% |

Fig. 11

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT INCREASE IN WEIGHT OF SONICATED SEED | CONTROL SEED WEIGHT BEFORE SOAKING (mg) | CONTROL SEED WEIGHT POST SOAKING (mg) | CONTROL SEED WEIGHT DIFFERENCE | PERCENT INCREASE IN WEIGHT OF SOAKED SEED (CONTROL) |
|---|---|---|---|---|---|---|---|---|
| 1 | 282.3 | 334.5 | 52.2 | 18.5% | 297.4 | 317.2 | 19.8 | 6.7% |
| 2 | 286.1 | 340.3 | 54.1 | 18.9% | 286.6 | 303.4 | 16.8 | 5.9% |
| 3 | 281.7 | 336.2 | 54.5 | 19.3% | 274.5 | 296.6 | 22.1 | 8.1% |
| 4 | 297.6 | 346.8 | 49.3 | 16.6% | 286.7 | 305.8 | 19.1 | 6.7% |
| 5 | 286.4 | 337.6 | 51.2 | 17.9% | 301.4 | 324.0 | 22.6 | 7.5% |
| 6 | 284.5 | 325.6 | 41.1 | 14.4% | 292.1 | 310.9 | 18.8 | 6.5% |
| 7 | 282.2 | 334.4 | 52.2 | 18.5% | 272.0 | 287.4 | 15.4 | 5.7% |
| 8 | 287.8 | 340.9 | 53.1 | 18.5% | 280.8 | 298.4 | 17.6 | 6.3% |
| 9 | 282.6 | 332.6 | 50.0 | 17.7% | 288.5 | 309.7 | 21.2 | 7.3% |
| 10 | 282.4 | 337.4 | 55.0 | 19.5% | 280.7 | 301.0 | 20.3 | 7.2% |
| 11 | 285.9 | 328.5 | 42.6 | 14.9% | 290.4 | 312.0 | 21.6 | 7.4% |
| 12 | 294.1 | 343.9 | 49.8 | 16.9% | 297.1 | 318.3 | 21.2 | 7.1% |
| MEAN: | 286.1 | 336.5 | 50.4 | 17.6% | 287.3 | 307.0 | 19.7 | 6.9% |
| STDDEV: | 5.0 | 6.1 | 4.4 | 1.6% | 9.1 | 10.4 | 2.2 | 0.7% |

Fig. 12

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT INCREASE IN WEIGHT OF SONICATED SEED | CONTROL SEED WEIGHT BEFORE SOAKING (mg) | CONTROL SEED WEIGHT POST SOAKING (mg) | CONTROL SEED WEIGHT DIFFERENCE | PERCENT INCREASE IN WEIGHT OF SOAKED SEED (CONTROL) |
|---|---|---|---|---|---|---|---|---|
| 1 | 35 | 44 | 9 | 25.7% | 51 | 54 | 3 | 5.9% |
| 2 | 45 | 53 | 8 | 17.8% | 50 | 53 | 3 | 6.0% |
| 3 | 32 | 38 | 6 | 18.8% | 46 | 48 | 2 | 4.3% |
| 4 | 55 | 64 | 9 | 16.4% | 56 | 59 | 3 | 5.4% |
| 5 | 53 | 61 | 8 | 15.1% | 56 | 61 | 5 | 8.9% |
| 6 | 27 | 31 | 4 | 14.8% | 35 | 38 | 3 | 8.6% |
| 7 | 59 | 69 | 10 | 16.9% | 44 | 47 | 3 | 6.8% |
| 8 | 29 | 34 | 5 | 17.2% | 50 | 55 | 5 | 10.0% |
| 9 | 33 | 40 | 7 | 21.2% | 48 | 50 | 2 | 4.2% |
| 10 | 55 | 63 | 8 | 14.5% | 47 | 51 | 4 | 8.5% |
| 11 | 51 | 61 | 10 | 19.6% | 35 | 37 | 2 | 5.7% |
| 12 | 51 | 60 | 9 | 17.6% | 54 | 57 | 3 | 5.6% |
| 13 | 53 | 62 | 9 | 17.0% | 37 | 40 | 3 | 8.1% |
| 14 | 41 | 51 | 10 | 24.4% | 57 | 61 | 4 | 7.0% |
| 15 | 45 | 51 | 6 | 13.3% | 54 | 57 | 3 | 5.6% |
| 16 | 38 | 40 | 2 | 5.3% | 49 | 52 | 3 | 6.1% |
| 17 | 54 | 64 | 10 | 18.5% | 43 | 46 | 3 | 7.0% |
| 18 | 42 | 50 | 8 | 19.0% | 50 | 54 | 4 | 8.0% |
| 19 | 56 | 64 | 8 | 14.3% | 47 | 49 | 2 | 4.3% |
| 20 | 50 | 60 | 10 | 20.0% | 39 | 41 | 2 | 5.1% |
| MEAN: | 45.2 | 53 | 7.8 | 17.4% | 47.4 | 50.5 | 3.1 | 6.6% |
| STDDEV: | 9.97 | 11.54 | 2.21 | 4.3% | 6.82 | 7.29 | 0.91 | 1.7% |

GROUP 1

| GROUP #, 20 SEEDS PER RUN | SEED WEIGHT BEFORE SONICATION (mg) | SEED WEIGHT POST SONICATION (mg) | CHANGE IN WEIGHT (mg) | PERCENT WATER UPTAKE |
|---|---|---|---|---|
| 1 | 2960 | 3174 | 214 | 7.2% |
| 2 | 2921 | 3220 | 299 | 10.2% |
| 3 | 2814 | 2903 | 89 | 3.2% |
| 4 | 2724 | 3032 | 308 | 11.3% |
| 5 | 2683 | 2887 | 204 | 7.6% |
| MEAN: | | | | 7.9% |
| STDEV: | | | | 3.2% |

GROUP 2

| GROUP #, 20 SEEDS PER RUN | SEED WEIGHT BEFORE SONICATION (mg) | SEED WEIGHT POST SONICATION (mg) | CHANGE IN WEIGHT (mg) | PERCENT WATER UPTAKE |
|---|---|---|---|---|
| 1 | 2929 | 3322 | 393 | 13.4% |
| 2 | 2850 | 3147 | 297 | 10.4% |
| 3 | 2864 | 3159 | 295 | 10.3% |
| 4 | 2619 | 3016 | 397 | 15.2% |
| 5 | 2893 | 3257 | 364 | 12.6% |
| MEAN: | | | | 12.4% |
| STDEV: | | | | 2.1% |

GROUP 3

| GROUP #, 20 SEEDS PER RUN | SEED WEIGHT BEFORE SONICATION (mg) | SEED WEIGHT POST SONICATION (mg) | CHANGE IN WEIGHT (mg) | PERCENT WATER UPTAKE |
|---|---|---|---|---|
| 1 | 2944 | 3477 | 533 | 18.1% |
| 2 | 2743 | 3152 | 409 | 14.9% |
| 3 | 2594 | 3049 | 455 | 17.5% |
| 4 | 2857 | 3477 | 620 | 21.7% |
| 5 | 2876 | 3405 | 529 | 18.4% |
| MEAN: | | | | 18.1% |
| STDEV: | | | | 2.4% |

GROUP 1 (soaking)

| GROUP #, 20 SEEDS PER RUN | SEED WEIGHT BEFORE SOAKING (mg) | SEED WEIGHT POST SOAKING (mg) | CHANGE IN WEIGHT | PERCENT WATER UPTAKE (mg) |
|---|---|---|---|---|
| 1 | 2653 | 2675 | 22 | 0.8% |
| 2 | 2884 | 2949 | 65 | 2.3% |
| 3 | 2575 | 2629 | 54 | 2.1% |
| 4 | 2774 | 2831 | 57 | 2.1% |
| 5 | 2941 | 3015 | 74 | 2.5% |
| MEAN: | | | | 2.0% |
| STDEV: | | | | 0.7% |

GROUP 2 (soaking)

| GROUP #, 20 SEEDS PER RUN | SEED WEIGHT BEFORE SOAKING (mg) | SEED WEIGHT POST SOAKING (mg) | CHANGE IN WEIGHT | PERCENT WATER UPTAKE (mg) |
|---|---|---|---|---|
| 1 | 2736 | 2801 | 65 | 2.4% |
| 2 | 2911 | 3025 | 114 | 3.9% |
| 3 | 2986 | 3148 | 162 | 5.4% |
| 4 | 2773 | 2856 | 83 | 3.0% |
| 5 | 2823 | 2896 | 73 | 2.6% |
| MEAN: | | | | 3.5% |
| STDEV: | | | | 1.2% |

GROUP 3 (soaking)

| GROUP #, 20 SEEDS PER RUN | SEED WEIGHT BEFORE SOAKING (mg) | SEED WEIGHT POST SOAKING (mg) | CHANGE IN WEIGHT | PERCENT WATER UPTAKE (mg) |
|---|---|---|---|---|
| 1 | 2848 | 3038 | 190 | 6.7% |
| 2 | 2794 | 2965 | 171 | 6.1% |
| 3 | 2712 | 2803 | 91 | 3.4% |
| 4 | 2957 | 3173 | 216 | 7.3% |
| 5 | 2946 | 3058 | 112 | 3.8% |
| MEAN: | | | | 5.9% |
| STDEV: | | | | 1.8% |

| SONICATED 39% 1X ||||
|---|---|---|---|---|
| TIME OF TREATEMENT IN MINUTES | WEIGHT BEFORE 20 SEEDS (mg) | WEIGHT AFTER 20 SEEDS (mg) | SEED WEIGHT DIFFERENCE 20 SEEDS (mg) | PERCENT OF WATER UPTAKE |
| 2 | 5604 | 5872 | 268 | 4.8% |
| 4 | 5578 | 6009 | 431 | 7.7% |
| 6 | 5502 | 6028 | 526 | 9.6% |
| 8 | 5515 | 6196 | 681 | 12.3% |
| 8 | 5429 | 5978 | 549 | 10.1% |
| 10 | 5520 | 6290 | 770 | 13.9% |
| 10 | 5410 | 6197 | 787 | 14.5% |
| 12 | 5617 | 6276 | 659 | 11.7% |

| CONTROL SOAKED ||||
|---|---|---|---|---|
| TIME OF TREATEMENT IN MINUTES | WEIGHT BEFORE 20 SEEDS (mg) | WEIGHT AFTER 20 SEEDS (mg) | SEED WEIGHT DIFFERENCE 20 SEEDS (mg) | PERCENT OF WATER UPTAKE |
| 2 | 5440 | 5575 | 135 | 2.5% |
| 4 | 5376 | 5507 | 131 | 2.4% |
| 6 | 5575 | 5668 | 93 | 1.7% |
| 8 | 5275 | 5346 | 71 | 1.3% |
| 8 | 5353 | 5440 | 87 | 1.6% |
| 10 | 5428 | 5595 | 167 | 3.1% |
| 10 | 5447 | 5624 | 177 | 3.2% |
| 12 | 5493 | 5593 | 100 | 1.8% |

*Fig. 15*

| TIME OF TREATEMENT IN MINUTES | WEIGHT BEFORE 20 SEEDS (mg) | WEIGHT AFTER 20 SEEDS (mg) | SEED WEIGHT DIFFERENCE 20 SEEDS (mg) | PERCENT OF WATER UPTAKE |
|---|---|---|---|---|
| 2 | 5612 | 6018 | 406 | 7.2% |
| 4 | 5700 | 6608 | 908 | 15.9% |
| 6 | 5616 | 6593 | 977 | 17.4% |
| 8 | 5796 | 6780 | 984 | 17.0% |
| 10 | 5769 | 6710 | 941 | 16.3% |
| 10 Soaked con. | 5655 | 5940 | 285 | 5.0% |

| TIME OF TREATEMENT IN MINUTES | WEIGHT BEFORE 20 SEEDS (mg) | WEIGHT AFTER 20 SEEDS (mg) | SEED WEIGHT DIFFERENCE 20 SEEDS (mg) | PERCENT OF WATER UPTAKE |
|---|---|---|---|---|
| 2 | 6244 | 6663 | 419 | 6.7% |
| 4 | 6284 | 6896 | 612 | 9.7% |
| 6 | 5891 | 6553 | 662 | 11.2% |
| 8 | 6467 | 7434 | 967 | 15.0% |
| 10 | 6207 | 7082 | 875 | 14.1% |
| 10 Soaked con. | 6239 | 6605 | 366 | 5.9% |

| TIME OF TREATEMENT IN MINUTES | WEIGHT BEFORE 20 SEEDS (mg) | WEIGHT AFTER 20 SEEDS (mg) | SEED WEIGHT DIFFERENCE 20 SEEDS (mg) | PERCENT OF WATER UPTAKE |
|---|---|---|---|---|
| 2 | 2739 | 3316 | 577 | 21.1% |
| 4 | 2999 | 3732 | 733 | 24.4% |
| 6 | 3061 | 3939 | 878 | 28.7% |
| 8 | 2815 | 3752 | 937 | 33.3% |
| 8 Soaked con. | 2657 | 2929 | 272 | 10.2% |

Fig. 16

| TIME OF TREATEMENT IN MINUTES | WEIGHT BEFORE 20 SEEDS (mg) | WEIGHT AFTER 20 SEEDS (mg) | SEED WEIGHT DIFFERENCE 20 SEEDS (mg) | PERCENT OF WATER UPTAKE |
|---|---|---|---|---|
| 4 | 5660 | 6350 | 690 | 12.2% |
| 6 | 5711 | 6570 | 859 | 15.0% |
| 8 | 5629 | 6688 | 1059 | 18.8% |
| 10 | 5636 | 6815 | 1179 | 20.9% |
| 8 Soaked con. | 5682 | 5985 | 303 | 5.3% |

| TIME OF TREATEMENT IN MINUTES | WEIGHT BEFORE 20 SEEDS (mg) | WEIGHT AFTER 20 SEEDS (mg) | SEED WEIGHT DIFFERENCE 20 SEEDS (mg) | PERCENT OF WATER UPTAKE |
|---|---|---|---|---|
| 4 | 6288 | 6875 | 587 | 9.3% |
| 6 | 6123 | 6767 | 644 | 10.5% |
| 8 | 5721 | 6472 | 751 | 13.1% |
| 10 | 6271 | 7164 | 893 | 14.2% |
| 10 Soaked con. | 6030 | 6410 | 380 | 6.3% |

| TIME OF TREATEMENT IN MINUTES | WEIGHT BEFORE 20 SEEDS (mg) | WEIGHT AFTER 20 SEEDS (mg) | SEED WEIGHT DIFFERENCE 20 SEEDS (mg) | PERCENT OF WATER UPTAKE |
|---|---|---|---|---|
| 4 | 2853 | 3665 | 812 | 28.5% |
| 6 | 2839 | 3876 | 1037 | 36.5% |
| 8 | 2754 | 3805 | 1051 | 38.2% |
| 8 Soaked con. | 2902 | 3252 | 350 | 12.1% |

Fig. 17

Facilitated Uptake of Cresyl Violet by Sonication
Sonication clears a cresyl violet solution by promoting preferential uptake of the dye by seed.
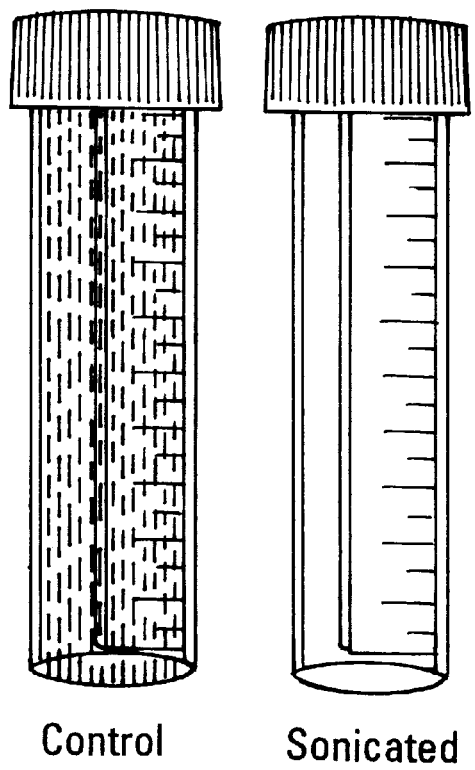
Control     Sonicated
The dye becomes concentrated in the corn embryo.
Control                     Sonicated
*Fig. 18*

Extracted Amount Of Stain (Toluidine Blue) in Corn.

| | Sonicated 15 minutes in 750 ug Stain in 15 ml water | | Soaked 15 minutes in 750 ug Stain in 15 ml water | |
|---|---|---|---|---|
| | 1. 104 ug | | 1. 8 ug | |
| | 2. 78 ug | | 2. 9 ug | |
| Group1 | 3. 83 ug | | 3. 10 ug | |
| | 4. 65 ug | | 4. 10 ug | |
| | 5. <u>38 ug</u> | | 5. <u>5 ug</u> | |
| | Total 368 ug | 49% | Total 42 ug | 5.6% |
| | 1. 88 ug | | 1. 6 ug | |
| | 2. 56 ug | | 2. 2 ug | |
| Group2 | 3. 46 ug | | 3. 2 ug | |
| | 4. 53 ug | | 4. 4 ug | |
| | 5. <u>63 ug</u> | | 5. <u>9 ug</u> | |
| | Total 360 ug | 41% | Total 23 ug | 3.1% |

*Fig. 19*

SONICATED 30% 1X

| TIME OF TREATMENT IN MINUTES | WEIGHT BEFORE 20 SEEDS (mg) | WEIGHT AFTER 20 SEEDS (mg) | SEED WEIGHT DIFFERENCE 20 SEEDS (mg) | PERCENT OF WATER UPTAKE |
|---|---|---|---|---|
| 1 | 5650 | 5854 | 204 | 3.6% |
| 2 | 5693 | 6161 | 468 | 8.2% |
| 4 | 5791 | 6716 | 925 | 16.0% |
| 6 | 5484 | 6338 | 854 | 15.6% |
| 8 | 5618 | 6658 | 1040 | 18.5% |
| 10 | 5686 | 7004 | 1318 | 23.2% |

CONTROL SOAKED

| TIME OF TREATMENT IN MINUTES | WEIGHT BEFORE 20 SEEDS (mg) | WEIGHT AFTER 20 SEEDS (mg) | SEED WEIGHT DIFFERENCE 20 SEEDS (mg) | PERCENT OF WATER UPTAKE |
|---|---|---|---|---|
| 1 | 5666 | 5758 | 92 | 1.6% |
| 2 | 5606 | 5750 | 144 | 2.6% |
| 4 | 5456 | 5644 | 188 | 3.4% |
| 6 | 5613 | 5842 | 229 | 4.1% |
| 8 | 5576 | 5836 | 260 | 4.7% |
| 10 | 5776 | 6076 | 300 | 5.2% |

*Fig. 21*

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT OF SONICATED SEED WATER UPTAKE (mg) | CONTROL SEED WEIGHT BEFORE SOAKING (mg) | CONTROL SEED WEIGHT POST SOAKING (mg) | CONTROL SEED WEIGHT DIFFERENCE (mg) | PERCENT OF CONTROL SEED WATER UPTAKE |
|---|---|---|---|---|---|---|---|---|
| 1 | 275 | 286 | 11 | 4.0% | 286 | 300 | 14 | 4.9% |
| 2 | 277 | 286 | 9 | 3.2% | 285 | 299 | 14 | 4.9% |
| 3 | 274 | 289 | 15 | 5.5% | 230 | 235 | 5 | 2.2% |
| 4 | 272 | 294 | 22 | 8.1% | 241 | 249 | 8 | 3.3% |
| 5 | 252 | 261 | 9 | 3.6% | 256 | 263 | 7 | 2.7% |
| 6 | 264 | 271 | 7 | 2.7% | 268 | 273 | 5 | 1.9% |
| 7 | 292 | 311 | 19 | 6.5% | 279 | 287 | 8 | 2.9% |
| 8 | 244 | 253 | 9 | 3.7% | 298 | 305 | 7 | 2.3% |
| 9 | 340 | 344 | 4 | 1.2% | 278 | 282 | 4 | 1.4% |
| 10 | 241 | 248 | 7 | 2.9% | 259 | 264 | 5 | 1.9% |
| 11 | 283 | 296 | 13 | 4.6% | 283 | 284 | 1 | 0.4% |
| 12 | 305 | 309 | 4 | 1.3% | 291 | 297 | 6 | 2.1% |
| 13 | 291 | 293 | 2 | 0.7% | 304 | 307 | 3 | 1.0% |
| 14 | 305 | 320 | 15 | 4.9% | 277 | 279 | 2 | 0.7% |
| 15 | 306 | 310 | 4 | 1.3% | 288 | 288 | 0 | 0.0% |
| 16 | 294 | 311 | 17 | 5.8% | 350 | 353 | 3 | 0.9% |
| 17 | 258 | 272 | 14 | 5.4% | 302 | 302 | 0 | 0.0% |
| 18 | 274 | 282 | 8 | 2.9% | 295 | 295 | 0 | 0.0% |
| 19 | 310 | 316 | 6 | 1.9% | 304 | 304 | 0 | 0.0% |
| 20 | 292 | 302 | 10 | 3.4% | 291 | 292 | 1 | 0.3% |
| MEAN | 282.5 | 292.7 | 10.3 | 3.7% | 283.3 | 287.9 | 4.7 | 1.7% |
| STD DEV | 24.5 | 24.0 | 5.4 | 2.0% | 25.6 | 24.7 | 4.2 | 1.5% |

Fig. 22

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT OF SONICATED SEED WATER UPTAKE (mg) | CONTROL SEED WEIGHT BEFORE SOAKING (mg) | CONTROL SEED WEIGHT POST SOAKING (mg) | CONTROL SEED WEIGHT DIFFERENCE (mg) | PERCENT OF CONTROL SEED WATER UPTAKE |
|---|---|---|---|---|---|---|---|---|
| 1 | 303 | 316 | 13 | 4.3% | 285 | 295 | 10 | 3.5% |
| 2 | 292 | 314 | 22 | 7.5% | 288 | 297 | 9 | 3.1% |
| 3 | 328 | 358 | 30 | 9.1% | 288 | 296 | 8 | 2.8% |
| 4 | 248 | 270 | 22 | 8.9% | 317 | 326 | 9 | 2.8% |
| 5 | 286 | 332 | 46 | 16.1% | 255 | 262 | 7 | 2.7% |
| 6 | 287 | 321 | 34 | 11.8% | 291 | 299 | 8 | 2.7% |
| 7 | 292 | 302 | 10 | 3.4% | 259 | 265 | 6 | 2.3% |
| 8 | 303 | 342 | 39 | 12.9% | 236 | 241 | 5 | 2.1% |
| 9 | 353 | 376 | 23 | 6.5% | 283 | 291 | 8 | 2.8% |
| 10 | 265 | 284 | 19 | 7.2% | 274 | 283 | 9 | 3.3% |
| 11 | 276 | 294 | 18 | 6.5% | 293 | 301 | 8 | 2.7% |
| 12 | 276 | 290 | 14 | 5.1% | 291 | 300 | 9 | 3.1% |
| 13 | 284 | 306 | 22 | 7.7% | 296 | 303 | 7 | 2.4% |
| 14 | 242 | 254 | 12 | 5.0% | 269 | 277 | 8 | 3.0% |
| 15 | 274 | 298 | 24 | 8.8% | 289 | 294 | 5 | 1.7% |
| 16 | 300 | 315 | 15 | 5.0% | 266 | 275 | 9 | 3.4% |
| 17 | 243 | 251 | 8 | 3.3% | 334 | 341 | 7 | 2.1% |
| 18 | 267 | 312 | 45 | 16.9% | 244 | 248 | 4 | 1.6% |
| 19 | 287 | 325 | 38 | 13.2% | 293 | 299 | 6 | 2.0% |
| 20 | 287 | 301 | 14 | 4.9% | 254 | 257 | 3 | 1.2% |
| MEAN | 284.7 | 308.1 | 23.4 | 8.2% | 280.3 | 287.5 | 7.3 | 2.6% |
| STD DEV | 26.6 | 31.1 | 11.6 | 4.0% | 23.7 | 24.7 | 1.9 | 0.6% |

Fig. 23

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT OF SONICATED SEED WATER UPTAKE | CONTROL SEED WEIGHT BEFORE SOAKING (mg) | CONTROL SEED WEIGHT POST SOAKING (mg) | CONTROL SEED WEIGHT DIFFERENCE (mg) | PERCENT OF CONTROL SEED WATER UPTAKE |
|---|---|---|---|---|---|---|---|---|
| 1 | 321 | 381 | 60 | 18.7% | 259 | 268 | 9 | 3.5% |
| 2 | 315 | 341 | 26 | 8.3% | 275 | 286 | 11 | 4.0% |
| 3 | 285 | 310 | 25 | 8.8% | 280 | 294 | 14 | 5.0% |
| 4 | 258 | 283 | 25 | 9.7% | 270 | 287 | 17 | 6.3% |
| 5 | 262 | 289 | 27 | 10.3% | 253 | 265 | 12 | 4.7% |
| 6 | 301 | 330 | 29 | 9.6% | 281 | 294 | 13 | 4.6% |
| 7 | 312 | 368 | 56 | 17.9% | 269 | 280 | 6 | 4.1% |
| 8 | 291 | 344 | 53 | 18.2% | 271 | 282 | 11 | 4.1% |
| 9 | 309 | 357 | 48 | 15.5% | 296 | 304 | 8 | 2.7% |
| 10 | 314 | 374 | 60 | 19.1% | 264 | 271 | 7 | 2.7% |
| 11 | 287 | 350 | 63 | 22.0% | 275 | 284 | 9 | 3.3% |
| 12 | 299 | 390 | 91 | 30.4% | 258 | 265 | 7 | 2.7% |
| 13 | 274 | 290 | 16 | 5.8% | 271 | 278 | 7 | 2.6% |
| 14 | 337 | 433 | 96 | 28.5% | 256 | 263 | 7 | 2.7% |
| 15 | 284 | 375 | 91 | 32.0% | 269 | 275 | 6 | 2.2% |
| 16 | 268 | 303 | 35 | 13.1% | 269 | 275 | 6 | 2.2% |
| 17 | 243 | 266 | 23 | 9.5% | 247 | 255 | 8 | 3.2% |
| 18 | 278 | 319 | 41 | 14.7% | 290 | 299 | 9 | 3.1% |
| 19 | 282 | 308 | 26 | 9.2% | 293 | 300 | 7 | 2.4% |
| 20 | 271 | 305 | 34 | 12.5% | 310 | 319 | 9 | 2.9% |
| MEAN | 289.6 | 335.8 | 46.3 | 15.7% | 272.8 | 282.2 | 9.2 | 3.5% |
| STD DEV | 23.9 | 42.9 | 24.5 | 7.7% | 15.6 | 16.1 | 3.0 | 1.1% |

Fig. 24

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT OF SONICATED SEED WATER UPTAKE (mg) | CONTROL SEED WEIGHT BEFORE SOAKING (mg) | CONTROL SEED WEIGHT POST SOAKING (mg) | CONTROL SEED WEIGHT DIFFERENCE (mg) | PERCENT OF CONTROL SEED WATER UPTAKE |
|---|---|---|---|---|---|---|---|---|
| 1 | 291 | 332 | 41 | 14.1% | 292 | 304 | 12 | 4.1% |
| 2 | 281 | 331 | 50 | 17.8% | 292 | 304 | 12 | 4.1% |
| 3 | 301 | 330 | 29 | 9.6% | 278 | 288 | 10 | 3.6% |
| 4 | 292 | 319 | 27 | 9.2% | 272 | 282 | 10 | 3.7% |
| 5 | 245 | 287 | 42 | 17.1% | 285 | 298 | 13 | 4.6% |
| 6 | 269 | 342 | 73 | 27.1% | 266 | 276 | 10 | 3.8% |
| 7 | 290 | 317 | 27 | 9.3% | 309 | 323 | 6 | 4.5% |
| 8 | 301 | 336 | 35 | 11.6% | 295 | 307 | 12 | 4.1% |
| 9 | 256 | 298 | 42 | 16.4% | 271 | 281 | 10 | 3.7% |
| 10 | 254 | 291 | 37 | 14.6% | 271 | 281 | 10 | 3.7% |
| 11 | 276 | 316 | 40 | 14.5% | 274 | 283 | 9 | 3.3% |
| 12 | 250 | 291 | 41 | 16.4% | 268 | 280 | 12 | 4.5% |
| 13 | 296 | 329 | 33 | 11.1% | 267 | 279 | 12 | 4.5% |
| 14 | 244 | 299 | 55 | 22.5% | 246 | 256 | 10 | 4.1% |
| 15 | 292 | 342 | 50 | 17.1% | 278 | 289 | 11 | 4.0% |
| 16 | 277 | 308 | 31 | 11.2% | 331 | 349 | 18 | 5.4% |
| 17 | 276 | 319 | 43 | 15.6% | 282 | 291 | 9 | 3.2% |
| 18 | 253 | 307 | 54 | 21.3% | 257 | 268 | 11 | 4.3% |
| 19 | 282 | 327 | 45 | 16.0% | 292 | 304 | 12 | 4.1% |
| 20 | 258 | 316 | 58 | 22.5% | 287 | 299 | 12 | 4.2% |
| MEAN | 274.2 | 316.9 | 42.7 | 15.8% | 280.7 | 292.1 | 11.1 | 4.1% |
| STD DEV | 19.2 | 17.1 | 11.6 | 4.9% | 18.7 | 20.3 | 2.3 | 0.5% |

Fig. 25

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT OF SONICATED SEED WATER UPTAKE (mg) | CONTROL SEED WEIGHT BEFORE SOAKING (mg) | CONTROL SEED WEIGHT POST SOAKING (mg) | CONTROL SEED WEIGHT DIFFERENCE (mg) | PERCENT OF CONTROL SEED WATER UPTAKE |
|---|---|---|---|---|---|---|---|---|
| 1 | 232 | 279 | 47 | 20.3% | 294 | 307 | 13 | 4.4% |
| 2 | 300 | 377 | 77 | 25.7% | 267 | 278 | 11 | 4.1% |
| 3 | 286 | 370 | 84 | 29.4% | 262 | 272 | 10 | 3.8% |
| 4 | 276 | 311 | 35 | 12.7% | 266 | 282 | 16 | 6.0% |
| 5 | 276 | 325 | 49 | 17.8% | 311 | 330 | 19 | 6.1% |
| 6 | 281 | 319 | 38 | 13.5% | 253 | 265 | 12 | 4.7% |
| 7 | 265 | 312 | 47 | 17.7% | 313 | 326 | 13 | 4.2% |
| 8 | 298 | 338 | 40 | 13.4% | 269 | 285 | 16 | 5.9% |
| 9 | 280 | 331 | 51 | 18.2% | 267 | 278 | 11 | 4.1% |
| 10 | 299 | 350 | 51 | 17.1% | 271 | 285 | 14 | 5.2% |
| 11 | 289 | 327 | 38 | 13.1% | 252 | 263 | 11 | 4.4% |
| 12 | 251 | 297 | 46 | 18.3% | 272 | 284 | 12 | 4.4% |
| 13 | 285 | 347 | 62 | 21.8% | 270 | 281 | 11 | 4.1% |
| 14 | 284 | 351 | 67 | 23.6% | 271 | 282 | 11 | 4.1% |
| 15 | 256 | 288 | 32 | 12.5% | 254 | 267 | 13 | 5.1% |
| 16 | 296 | 346 | 50 | 16.9% | 266 | 277 | 11 | 4.1% |
| 17 | 304 | 377 | 73 | 24.0% | 341 | 357 | 16 | 4.7% |
| 18 | 296 | 361 | 65 | 22.0% | 286 | 302 | 16 | 5.6% |
| 19 | 283 | 334 | 51 | 18.0% | 257 | 269 | 12 | 4.7% |
| 20 | 281 | 317 | 36 | 12.8% | 334 | 346 | 12 | 3.6% |
| MEAN | 280.9 | 332.9 | 52.0 | 18.4% | 304.0 | 291.8 | 12.7 | 4.7% |
| STD DEV | 18.2 | 27.9 | 14.8 | 4.8% | 288.0 | 27.4 | 2.9 | 0.8% |

Fig. 26

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT OF SONICATED SEED WATER UPTAKE (mg) | CONTROL SEED WEIGHT BEFORE SOAKING (mg) | CONTROL SEED WEIGHT POST SOAKING (mg) | CONTROL SEED WEIGHT DIFFERENCE (mg) | PERCENT OF CONTROL SEED WATER UPTAKE |
|---|---|---|---|---|---|---|---|---|
| 1 | 300 | 356 | 56 | 18.7% | 304 | 328 | 24 | 7.9% |
| 2 | 311 | 376 | 65 | 20.9% | 305 | 328 | 23 | 7.5% |
| 3 | 245 | 321 | 76 | 31.0% | 298 | 324 | 26 | 8.7% |
| 4 | 270 | 336 | 66 | 24.4% | 258 | 273 | 15 | 5.8% |
| 5 | 261 | 321 | 60 | 23.0% | 248 | 264 | 16 | 6.5% |
| 6 | 252 | 300 | 48 | 19.0% | 277 | 288 | 11 | 4.0% |
| 7 | 279 | 345 | 66 | 23.7% | 297 | 310 | 13 | 4.4% |
| 8 | 273 | 360 | 87 | 31.9% | 285 | 299 | 14 | 4.9% |
| 9 | 272 | 331 | 59 | 21.7% | 254 | 257 | 3 | 1.2% |
| 10 | 298 | 364 | 66 | 22.1% | 255 | 263 | 8 | 3.1% |
| 11 | 269 | 323 | 54 | 20.1% | 328 | 339 | 11 | 3.4% |
| 12 | 323 | 404 | 81 | 25.1% | 300 | 312 | 12 | 4.0% |
| 13 | 284 | 367 | 83 | 29.2% | 256 | 270 | 14 | 5.5% |
| 14 | 289 | 348 | 59 | 20.4% | 309 | 327 | 18 | 5.8% |
| 15 | 264 | 316 | 52 | 19.7% | 306 | 315 | 9 | 2.9% |
| 16 | 284 | 324 | 40 | 14.1% | 230 | 244 | 14 | 6.1% |
| 17 | 289 | 372 | 83 | 28.7% | 349 | 363 | 14 | 4.0% |
| 18 | 336 | 434 | 98 | 29.2% | 343 | 364 | 21 | 6.1% |
| 19 | 302 | 369 | 67 | 22.2% | 306 | 328 | 22 | 7.2% |
| 20 | 284 | 337 | 53 | 18.7% | 268 | 280 | 12 | 4.5% |
| MEAN | 284.3 | 350.2 | 66.0 | 23.2% | 288.8 | 303.8 | 15 | 5.2% |
| STD DEV | 22.9 | 32.1 | 14.7 | 4.7% | 32.4 | 35.0 | 5.8 | 1.9% |

*Fig. 27*

METHOD FOR UPTAKE OF A SUBSTANCE INTO A SEED

BACKGROUND OF THE INVENTION

1. Field of the Invention

The invention relates generally to an imbibition process for the uptake of water or other substances along with dissolved substances into a seed, more specifically, to a method of treating seeds with sound waves for the purpose of improving the rate of water and/or substance uptake into the seed wherein the substance enhances a growth characteristic of the seed or added value of the seed during commercial processing.

2. Background of the Prior Art

Seed dormancy is a unique form of developmental arrest utilized by most plants to temporally disperse germination and optimize progeny survival. During seed dormancy, moisture content and respiration rate are dramatically lowered. The initial step to break seed dormancy is the uptake of water (imbibition) necessary for respiration and mobilization of starch reserves required for germination. Imbibition is a biphasic process: 1) the physical uptake of water through the seed coat and hydration of the embryo and 2) germination as determined by growth and elongation of the embryonic axis resulting in emergence of the plumule and radicle. The two phases are separated temporally and seed which has completed phase I is said to be "primed seed," that is, primed for phase II: germination. Phase I of imbibition is also used in the commercial processing of seed, i.e. wet milling fractionation of corn and the malting process for the fermentation of distilled spirits.

Priming of seed by the enhanced imbibing of water is advantageous to plant vigor, e.g. enhanced emergence, growth and yield characteristics. Seed priming also synchronizes the germination of seed resulting in an uniform field of plants that matures simultaneously for maximal yields at harvest. In addition to water, seed priming provides access to load the seed with nutrients, microorganisms or pest inhibitors to promote seedling establishment. By adding the molecule to the seed during imbibition phase I, the molecule or organism can be stored in the primed seed and therefore, be present at planting. The "loading of macromolecules" is very efficient in the seed when compared to the addition of similar molecules to the entire field. An example is the addition of fertilizer to stimulate root growth and hasten seedling emergence. The loading of the fertilizer into the seed prior to planting is more efficacious to the seedling and cost effective to the farmer. Other beneficial molecules to be loaded into seed are hormones such as the gibberelins/gibberellic acid to promote germination, cytokinins for cell elongation and inhibitors of abscisic acid to promote release from seed dormancy. Seed cultivars could be customized to specific growing regions by the addition of triazoles (plant growth regulators which moderate the effects of drought and high temperatures) or fungicides to inhibit the growth of fungi on seed and seedlings in cool, wet soil or insecticides to combat insects that attack seedlings such as corn rootworm. In addition to macromolecules, beneficial microorganisms such as Azospirillum or Rhizobium can be loaded during seed priming as a crop innoculant.

The commercial fractionation of corn begins with wet milling. Corn is a complex mixture of starch, protein, oil, water, fiber, minerals, vitamins and pigments. Wet milling is the process of separating the corn components into separate, homogenous fractions. In Iowa, approximately 20% of the 1 billion bushels of corn harvested each year is wet milled.

The wet milling industry and collateral manufacturers represent a prodigious industrial effort. As the wet milling process is constantly refined by new technologies, novel by-products can be isolated in industrial quantities, e.g. ethanol, corn sweeteners, protein peptides and vitamins C and E. The initial step in wet-milling, steeping, has not been altered by technological innovation. Steeping involves soaking the clean and dried corn (<16% water content) in warm water until it has swollen to 45% hydration. This process takes from 30–50 hr. at temperatures of 120–130° F. During the steeping process, large quantities of water are moved through massive vats of corn in a countercurrent stream. Also during this time, beneficial microorganisms such as the lactobacteria and *Pseudomonas aeruginosa* growing in the steep water aid in the proteolytic cleavage of corn proteins. However, the large volumes of steep water and the time required for hydration limit the effectiveness of the bacterial digestion. The digestion by-products are purified from the steep water primarily by evaporative concentration.

The malting process is the first step in the fermentation of grain to produce alcoholic spirits. The quality of the malt (and the resulting fermentation) is dependent upon the synchronous and efficient germination of the grain. Starches stored in the seed are converted into sugars during early stages of germination. At emergence, germination is halted and converted sugars are used during fermentation for the production of ethanol. Historically, the malting process was a labor intensive task. The grain was spread onto a malting floor, imbibed with water from overhead sprinklers, and turned by hand daily over the course of one to two weeks to release trapped heat and gases. At plumule emergence, the starches have been converted to sugars, the germinated grain is kiln dried and ground to form malt. Microbreweries and distilleries still use variations of this old malting technique to produce high quality malt. Some distilleries induce uniform germination by the addition of gibberllic acid (GA) to produce the highest quality of malt for fermentation such as in single malt scotch distillation. GA is the plant hormone which regulates germination. Malt production of this quality is time consuming and expensive.

SUMMARY OF THE INVENTION

The invention consists of an imbibition process for the uptake of water and/or a beneficial substance into seed. The seed to be treated is immersed in water that includes molecules capable of enhancing a growth characteristic or commercial value of the seed. The seed is exposed to sound energy at frequencies between 15 kHz and 30 kHz for periods between about 1 and 15 minutes. The ultrasonic energy generates cavitational forces by the adiabatic collapse of microbubbles in the liquid medium, particularly those bubbles that collapse at the surface of the seed. The effect is substantially enhanced by saturating the water with a noble gas such as helium or argon, or combinations of inert gases.

Seed treated by this method upon germination exhibits an enhanced growth characteristic consistent with exposure to the given substance. The treated seed can be dried, stored and germinated at a later date while maintaining its enhanced growth characteristics.

A purpose of the invention is to impart upon seeds through an imbibition process an enhanced growth characteristic.

These and other objects of the invention will be made clear to a person of ordinary skill in the art upon a reading and understanding of this specification, the associated drawings, and appending claims.

BRIEF DESCRIPTION OF THE DRAWINGS

FIG. 2 shows a table with data from an experiment conducted with corn seed hybrid sonicated in helium saturated tap water.

FIG. 3 shows a table with data from an experiment conducted with corn seed hybrid sonicated in argon saturated water.

FIG. 4 shows a table with data from an experiment identical to the experiment that generated the data for the table of FIG. 3, except performed with a different corn seed hybrid.

FIG. 5 shows a table with data from an experiment identical to the experiment that generated the data for the table of FIG. 2 except performed with argon and helium saturated tap water.

FIG. 6 shows a table with data from an experiment identical to the experiment that generated the data for the table of FIG. 3 except performed with a different corn seed hybrid.

FIG. 7 shows a table with data from an experiment identical to the experiment that generated the data for the table of FIG. 2 except performed with argon saturated water.

FIG. 8 shows a table with data from an experiment identical to the experiment that generated the data for the table of FIG. 2 except performed with tap water.

FIG. 9 shows a table with data from an experiment identical to the experiment that generated the data for the table of FIG. 2 except performed with boiled double distilled water.

FIG. 10 shows a table with data from a different experiment conducted with corn seed hybrid sonicated in argon saturated tap water.

FIG. 11 shows a table with data from an experiment identical to the experiment that generated the data for the table of FIG. 10 except performed with a different corn seed hybrid.

FIG. 12 shows a table with data from an experiment identical to the experiment that generated the data for the table FIG. 10 except performed with yet another corn seed hybrid.

FIG. 13 shows a table with data from an experiment conducted with barley seed sonicated in argon saturated tap water.

FIG. 14 shows a table with data from a multiple trial experiment conducted on corn seed hybrid.

FIG. 15 shows a table with data from a multiple trial experiment conducted on corn seed hybrid.

FIG. 16 shows a table with data from a multiple trial experiment with three different corn seed hybrids with various sonication times.

FIG. 17 shows a table and with data from an experiment identical to the experiment that generated the data for the table of FIG. 16 performed at 75% amplitude.

FIG. 18 shows the uptake of cresyl violet dye into corn seeds.

FIG. 19 shows a table with data from an experiment with toluidine blue stain in corn seeds.

FIG. 21 shows a table of data from an experiment conducted with corn seed hybrid sonicated in argon saturated tap water for various time periods.

FIG. 22 shows a table of data from several trial of an experiment conducted with corn seed hybrid saturated in argon saturated tap water.

FIG. 23 shows a table of data from an experiment identical to the experiment that generated the data for the table of FIG. 22, except performed for a different time period.

FIG. 24 shows a table of data from an experiment identical to the experiment that generated the data for the table of FIG. 22, except performed for a different time period.

FIG. 25 shows a table of data from an experiment identical to the experiment that generated the data for the table of FIG. 22, except performed for a different time period.

FIG. 26 shows a table of data from an experiment identical to the experiment that generated the data for the table of FIG. 22, except performed for a different time period.

FIG. 27 shows a table of data from an experiment identical to the experiment that generated the data for the table of FIG. 22, except performed for a different time period.

DETAILED DESCRIPTION OF THE INVENTION

The invention describes a novel imbibition acceleration process 1) for the uptake of a substance into a seed, particularly useful for enhancing a growth characteristic of the seed with that characteristic transferring to an advantage for the resultant plant, and 2) for the uptake of water for corn processing purposes. The growth characteristic could be a resistance to a certain type of yield reducing pest, or a particular growth advantage based on the introduction of a developmental nutrient. In particular, pests can take the form of insects, weeds, mold, mildew and fungi. The substance responsible for imparting the enhanced growth characteristic could comprise an insecticide for giving the seed a resistance to a particular variety of insects, a herbicide for giving the seed a resistance to a particular variety of weed or plant, or a fungicide giving the seed a resistance to a particular variety of mold, mildew or fungi.

In the way of further illustrative examples of applications of the present invention, it is anticipated that the present method is applicable to corn wet milling used to produce corn starch, corn sweetener, corn oil, ethanol and animal feed by-products. Wet milling consist, generally, of five main steps: 1) steeping; 2) germ separation; 3) fiber washing and drying; 4) starch gluten separation; and 5) starch washing. The steeping step involves soaking corn kernels in a solution of sulfurous acid and water for a period of up to 48 hours. The steeping process cleans the corn kernels and softens the kernels to better allow the cracking the kernels to remove the germ, which contains the oil. As demonstrated herein, the imbibition process of the present invention could dramatically reduce the time required for steeping by accelerating the uptake of a water solution into the corn kernel.

Figure 20:
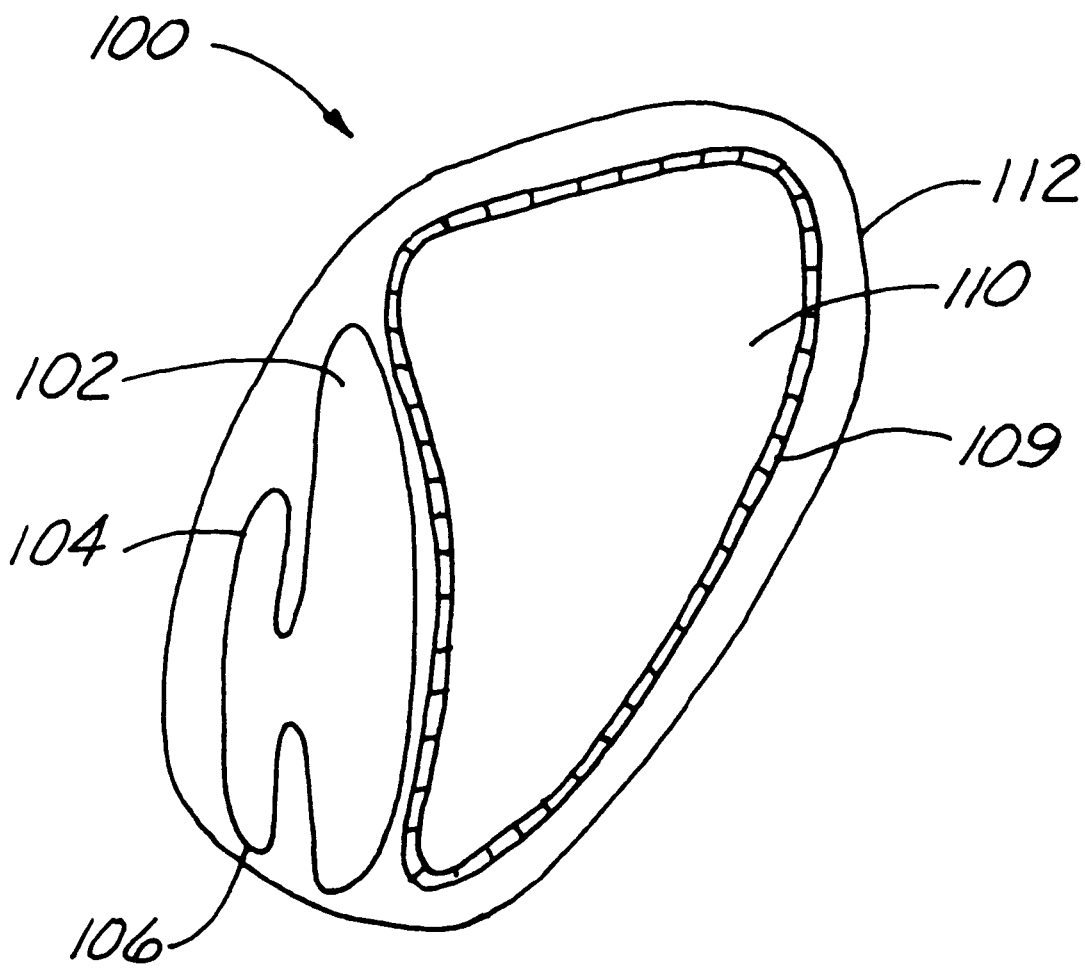
FIG. 20 shows a barley seed.

Moreover, imbibition plays a critical role in barley seed germination of particular interest in the field of factory malting. FIG. 20 shows a barley seed embryo 100, which includes a cotyledon 102 or the seed leaf, an epicotyl 104 which becomes the shoot, and a radicle 106 which becomes the root. Additionally, FIG. 20 shows a seed coat 112, an endosperm 110, and the aleurone layer 108.

The malting process, used for the production of certain alcoholic beverages, involves three basic steps: 1) steeping; 2) germination; and 3) kilning. In barley steeping, the amount and the uniformity of water uptake proves important. The time under water, the water temperature, the barley variety, and barley maturity comprise essential factors in creating the correct cast moisture. Steeping takes place in steep tanks where the barley seed 100 is mixed with a solution of water. The tanks are periodically roused with compressed air, to better ensure even uptake of the steeping solution. A uniform moisture content is very important to the quality and uniformity of the end product of the malting process.

The barley seeds 100 then begin to germinate. Barley's main role in the malting process is in the contribution of a rich source of sugar. Barley seeds 100, however, in their dry state contain very little sugar, but hold a large reserve of starch in the endosperm 110. Starch is a polymer of sugar, and through an interaction during germination the starch is converted to sugar. The biochemistry of this process begins with the imbibition of water through the seed coat 112 and into the interior of the barley seed. The water reacts with the cell embryo in a manner that releases a chemical known as gibberellic acid (GA), a plant hormone. The GA is transported throughout the barley seed 100 until it arrives at the aleurone layer 108 that surrounds the endosperm 110. In the aleurone layer 108, the GA acts to turn on certain genes in the nuclear DNA. The genes are transcribed resulting in the creation of messenger RNA, which interacts with a ribosome to begin the process of protein synthesis, or translation. The result is the creation of a protein called amylase. The amylase is transported out from the aleurone cells 108 and into the endosperm 110. The amylase is an enzyme that acts as a catalyst for the hydrolysis of starch into sugar.

The process of converting the starch to sugar in barley seeds is dose dependent. In other words, the amount of GA present effects the rate and uniformity of the germination and conversion process. Consequently, imbibition of a solution of water and GA according to the methods of the present invention will significantly reduce the amount of time in the malting process, and will increase the rate and uniformity of the germination and conversion of starch to sugar. Additionally, those of ordinary skill in the art will realize that the methods of the present invention apply equally to other growth hormones.

The imbibition process of the present invention is directed in particular to such important agricultural seeds as corn, barley, and soybeans by the sonication of such seeds in a liquid medium, preferably water. Again, those of ordinary skill in the art will appreciate the applicability of the present invention to other seeds types, without departing from the intended scope. The sonication is by the application of sound waves at ultrasonic frequencies from between about 15 kHz and 100 kHz and preferably between about 20 kHz and 30 kHz, with an optimum near 20 kHz.

Ultrasonic energy is applied to the liquid and seed mixture by a sound transducer immersed in the liquid medium. While not wishing to be bound by any particular theory as to the mechanism of the subject of the invention, it is currently believed that the acoustic energy is carried through the liquid by oscillations of the liquid molecules in the direction of propagation.

This produces alternating adiabatic compressions and decompressions together with corresponding increases and decreases in density and temperature. If the periodic decreases of pressure in the liquid are sufficiently high during the negative pressure phase, the cohesive forces of the liquid may be exceeded, at which point small cavities are formed by the process of cavitation. These small cavities then rapidly collapse, producing a very large amplitude shock wave with local temperatures up to a few hundred degrees centigrade or more. The collapse of the cavities are also known to create electrical discharges upon their collapse, giving rise to the effect known as sonoluminescence.

The effects of cavitation are greatly enhanced through the introduction of a variety of gases into the liquid. In the early 1930s, Frenzel and Schultes observed that photographic plates become exposed or fogged when submerged in water exposed to high frequency sound. This observation was the first recorded for the emission of light by acoustic waves or sonoluminescence. The physics of the phenomenon are not well understood.

With regard to the present invention, degassed distilled water requires an energy density level of approximately 1 to 10 watts/cm$^2$ before cavitation occurs. By saturating the water with a noble gas, such as one or more of the inert gases helium, neon, argon, krypton, xenon, or radon, cavitation effects are seen at much lower energy density levels and the effects at energy density levels on the order of 1 to 10 watts/cm$^2$ are greatly enhanced. This effect is believed to be due to the creation of microbubbles which more easily form the small cavities upon the application of sonic energy. Additionally, the cavities in the presence of the saturated gas are believed to generate shock waves of larger amplitude upon collapse of the cavities than are achieved with degassed water. In particular, it is believed that when tap water was saturated with argon gas, helium gas, or argon and helium gasses, generally more dramatic uptake will be observed and such effects were reproducible from experiment to experiment. Other experiments in which the saturating gas was nitrogen also exhibited enhanced effects, but not nearly as pronounced as with argon. However, some experiments conducted with tap water and with boiled double distilled water also produced satisfactory results.

Since cavitation results in mechanical stress, sonication may create or enlarge fissures in the seed coat pericarp similar to scarification, a well-known process by which certain seeds, especially seeds with thick seed coats, are able to germinate. Scarification is believed to accelerate imbibition of water through the pericarp. Simple scarification is unlikely to explain the novel effect disclosed herein, since scanning electron micrographs suggest no increase in the number of fissures in treated seed, but do indicate a change in pericarp texture. It has been found that the sonication process accelerates the imbibition of water. Cavitation may also result in physiological or biochemical changes in the seed which prime the germination process so that upon exposure of the seed to planting conditions, less time is needed for the seed to initiate germination, measured by the time when the radicle pushes through the pericarp. One mechanism proposed for causing physiological or biochemical changes is the production of free radicals by cavitaition.

The present method is carried out using an ultrasonic frequency generator for driving a piezoceramic sonicator, the horn of which is immersed in the liquid surrounding the seeds. After sonication, the seeds are dried, and then placed on a water-saturated filter pad, or in some cases, in wet soil, to induce germination. The temperature during germination has been varied to analyze the effect of the treatment on germination at various temperatures. Measurements which have been monitored in different experiments have included the time of emergence of the primary root, the time of emergence of secondary roots, the time for emergence of coleoptile, the root length and weight, the root area, the estimated volume of the root, the coleoptile length and weight, and the uptake of water. The seeds tested were first generation ($F_1$) hybrid seed corn.

Apparatus

Figure 1:
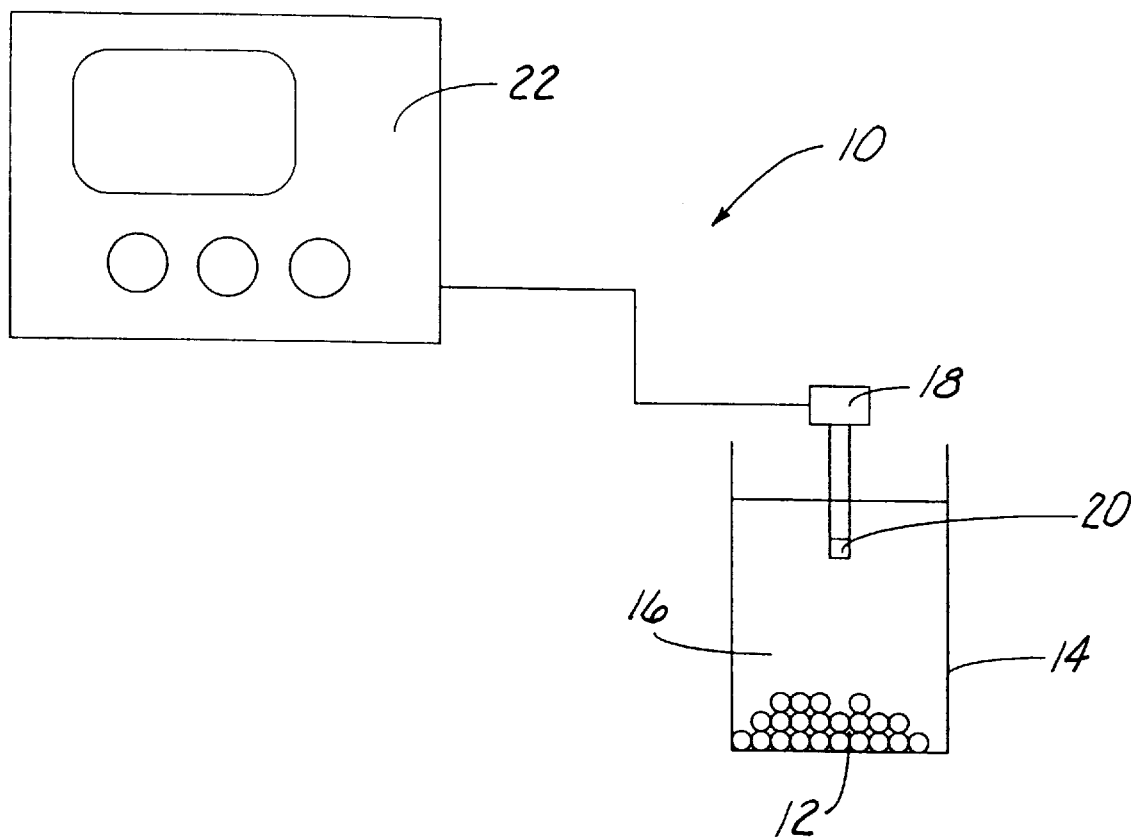
FIG. 1 is a diagrammatic view of the apparatus for practicing the present invention.

The apparatus used in the treatment of seeds according to the present invention is illustrated diagrammatically in FIG. 1, generally at 10. Seeds 12 are placed in a container 14 and covered with a liquid medium 16. A sound transducer 18 is suspended with the horn 20 of the transducer immersed in the liquid medium 16. The transducer is connected to an ultrasonic frequency generator 22. In the preferred embodiment, the sound transducer 18 is a piezoceramic transducer, Model VCX600 obtained commercially from Sonics and Materials, Inc. Alternative transducers may be used. Magnetostrictive transducers are capable of delivering higher levels of sound energy to the liquid media and may be preferably used if higher sound densities are desired, for example if large quantities of seed are to be sonicated. The frequency generator 22 is a Model 33120 Q obtained commercially from Hewlett Packard and is matched to the transducer 18. It has a frequency range of between 15 kHz and 30 kHz and can supply between zero and 500 watts to the sound transducer 18. In the experiments described herein, the power densities were between 30 watts per $cm^2$ and 80 watts per $cm^2$, although given the rated efficiency of the sound transducer 18, higher power densities can be achieved in the container 14.

Figure 28:
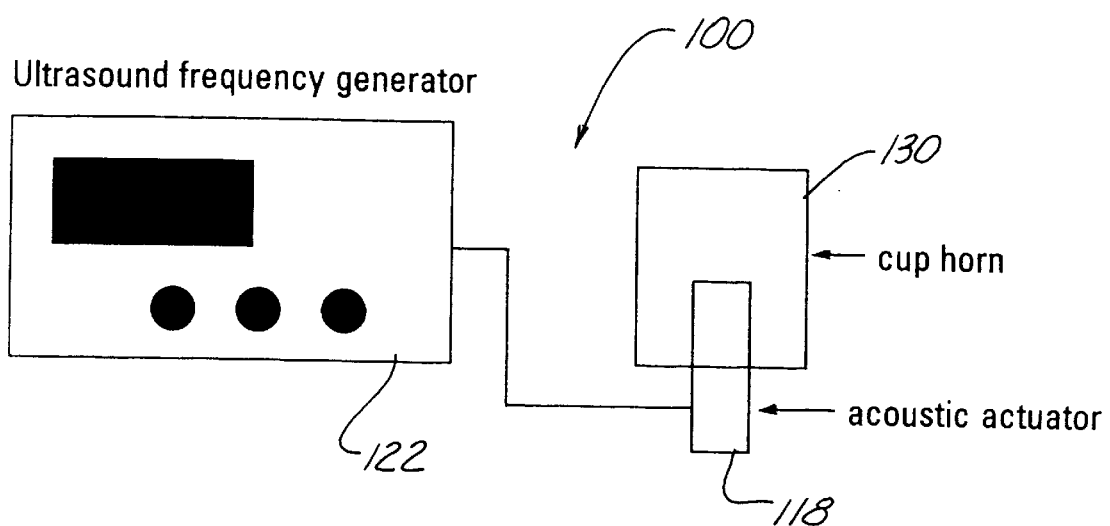
FIG. 28 shows an alternative apparatus for practicing the present invention.

FIG. 28 shows an alternative embodiment of an apparatus 100 of the present invention.

This differs from the apparatus 10 in the configuration of the cup horn 130. The apparatus 100 includes an ultrasound frequency generator 122, and an acoustic actuator 118 (or sound transducer). These components are generally the same as the ultrasonic frequency generator 22, and the sound transducer 18 of apparatus 10. The cup horn 130 replaces the horn 20 and container 14 of apparatus 10. In the apparatus 100 the cup horn 130 comprises a single piece member, that includes a horn surrounded by a glass container. The horn of the cup horn 130 is generally longer and flatter than the horn 20 of apparatus 10. The cup horn 130 mounts upward, relative to its counterpart in apparatus 10. The sample rests within the cup horn 130, otherwise, sonication takes place in a similar fashion regardless of the apparatus 10, 100 used. Water may be circulated through the wall of the cup horn 130 to maintain a constant temperature.

Experiments

A series of experiments were performed to demonstrate the effectiveness of the methods of the present invention. FIG. 2 shows the results of an experiment conducted with a Pioneer® #3394 corn seed hybrid. The experiment involved twenty trials with one seed per trial sonicated at 20 kHz with a 3 mm probe, at an amplitude of 39%, for a period of 10 minutes, in helium-saturated tap water. The seeds were placed individually in a 14 ml test tube packed in ice. By comparison, 20 Pioneer® #3394 corn seed hybrid seeds were soaked in helium-saturated tap water for a period of 10 minutes. The weight in mg. of each of the seeds was measured prior to sonication and soaking, and measured again after sonication and soaking. FIG. 2 shows the relative sonicated and soaked weight difference in absolute amount, and in relative terms. The relative percent water uptake reflects the weight gain as a percentage of the seed weight prior to sonication and soaking. The mean and standard deviation across the entire experiment is reflected in the last lines of the table depicted in FIG. 2, and shows clearly the enhanced uptake of water into the seeds due to the sonication process.

FIG. 3 shows the results of an experiment conducted with a Pioneer® #3939 corn seed hybrid. The experiment involved twenty trials with one seed per trial sonicated at 20 kHz with a 3 mm probe, at an amplitude of 39%, for a period of 10 minutes, in argon saturated tap water. The seeds were placed individually in a 14 ml test tube packed in ice. By comparison, 20 Pioneer® #3939 corn seed hybrid seeds were soaked in argon saturated tap water for a period of 10 minutes. The weights in mg. of each of the seeds was measured prior to sonication and soaking, and measured again after sonication and soaking. FIG. 3 shows the relative sonicated and soaked weight difference in absolute amount, and in relative terms. The relative percent water uptake reflects the weight gain as a percentage of the seed weight prior to sonication and soaking. The mean and standard deviation across the entire experiment is reflected in the last lines of the table depicted in FIG. 3, and again shows clearly the enhanced uptake of water into the seeds due to the sonication process.

FIG. 4 repeats the experiment described above and represented by the date shown in FIG. 3, except with Pioneer® #3963 corn seed hybrid seeds. Similarly FIG. 4 shows that superior water uptake result from the sonication process.

FIG. 5 repeats the experiment described above and represented by the date shown in FIG. 2, except that argon and helium saturated tap water was used for both the sonicated and soaked groups, again with similar results.

FIG. 6 repeats the experiment described above and represented by the data shown in FIG. 3, except with Pioneer® #5005 sweet corn hybrid seeds.

FIG. 7 repeats the experiment described above and represented by the data shown in FIG. 2, except that argon saturated tap water was used for both the sonicated and the soaked groups.

FIG. 8 repeats the experiment described above and represented by the data shown in FIG. 2, except that tap water was used for both the sonicated and the soaked groups.

FIG. 9 repeats the experiment described above and represented by the data shown in FIG. 2, except that boiled double distilled water was used for both the sonicated and the soaked groups.

FIG. 10 shows the results of an experiment conducted with a Pioneer® #3394 corn seed hybrid. The experiment involved a trial with 20 seeds per trials sonicated at 20 kHz with a 45 mm probe, at an amplitude of 30%, for a period of 10 minutes, in argon saturated tap water. Twelve groups of 20 seeds each were placed in a 2" diameter aluminum cup packed in ice. By comparison, twelve groups of 20 Pioneer® #3394 corn seed hybrid seeds were soaked in argon saturated tap water for a period of 10 minutes. The weight of 20 seeds in mg. was measured prior to sonication and soaked and the average weight of seed determined. They were measured again after sonication and soaking. FIG. 10 shows the average weight per seed for each of the 12 groups of 20 seeds. FIG. 10 shows the relative sonicated and soaked weight difference in absolute amount, and in relative terms. The relative percent water uptake reflects the weight gain as a percentage of the seed weight prior to sonication and soaking. The mean and standard deviation across the entire experiment is reflected in the last lines of the table depicted in FIG. 10, and again shows clearly the enhanced uptake of water into the seeds due to the sonication process.

FIG. 11 repeats the experiment described above and represented by the data shown in FIG. 10, except that Pioneer® #3820 corn seed hybrid was used.

FIG. 12 repeats the experiment described above and represented by the data shown in FIG. 10, except that Pioneer® #3963 corn seed hybrid was used.

FIG. 13 shows the results of an experiment conducted with a No. 3-141 barley seed, provided by Briess Malting Company of Chilton, Wis. The experiment involved twenty trials with one seed per trial sonicated at 20 kHz with a 3 mm probe, at an amplitude of 39%, for a period of 8 minutes, in argon saturated tap water. By comparison, twenty No. 3-141 barley seeds were soaked in argon saturated tap water for a period of 8 minutes. The weights in mg. of each of the seeds was measured prior to sonication and soaking, and measured again after sonication and soaking. FIG. 13 shows the average weight per seed for each of the twenty seeds.

FIG. 13 shows the relative sonicated and soaked weight difference in absolute amount, and in relative terms. The relative percent water uptake reflects the weight gain as a percentage of the seed weight prior to sonication and soaking. The mean and standard deviation across the entire experiment is reflected in the last lines of the table depicted in FIG. 11, and the results show that the barley seeds react to the sonication process in a manner similar to the corn hybrid seeds.

FIG. 14 shows the results of a series of experiments conducted with a Pioneer® #9281 soybean seed hybrid. The experiment involved three groups each comprised of five trials, each trial in turn comprising twenty seeds sonicated at 20 kHz with a 45 mm probe, at an amplitude of 30%, in argon saturated tap water. Group 1 was sonicated for 2 minutes, group 2 was sonicated for 4 minutes, and group 3 was sonicated for 6 minutes. Each groups of twenty seeds were placed in a 2" diameter aluminum cup packed in ice. By comparison, the soaking portion of the experiments were performed on three groups each comprising five trials, each trial comprising twenty Pioneer® #9281 soybean hybrid seeds soaked in argon saturated tap water. Group 1 was soaked for 2 minutes, groups 2 was soaked for 4 minutes and group 3 was soaked for 6 minutes. The weight in mg. of each of the seeds was measured prior to sonication and soaking, and measured again after sonication and soaking. FIG. 14 shows the weight for the entire seed groups of the five trials of twenty seeds for each of the three groups. FIG. 14 shows the relative sonicated and soaked weight difference in absolute amount, and in relative terms. The relative percent water uptake reflects the weight gain as a percentage of the seed weight prior to sonication and soaking. The mean and standard deviation across the entire experiment is reflected in the last lines of each groups as shown in FIG. 14, and again shows clearly the enhanced uptake of water into the seeds due to the sonication process.

FIG. 15 shows the results of a series of experiments conducted with the Pioneer® #3394 corn seed hybrid. The experiments involved several trials of twenty seeds per trial sonicated at 20 kHz with a 45 mm probe, at an amplitude of 39%, in argon saturated tap water. The sonication time varied from 2 minutes to 12 minutes in 2 minute increments. Each group of twenty seeds were placed in a 2" diameter aluminum cup packed in ice. By comparison, the soaking portion of the experiments was performed on groups of twenty Pioneer® #3394 corn hybrid seeds soaked in argon saturated tap water. The soaking time varied from 2 minutes to 12 minutes in 2 minute increments. FIG. 15 shows the total weight for the twenty seed groups for each of the varying sonication and soaking time groups. FIG. 15 shows the relative sonicated and soaked weight difference in absolute amount, and in relative terms for the entire seed groups.

The relative percent water uptake reflects the weight gain as a percentage of the seed weight prior sonication and soaking. The results allow comparison of the relative amounts of water uptake for sonication and for soaking, and show that over all time period involved sonication produces superior results.

FIG. 16 shows the results of a series of experiments conducted with three different hybrid corn seeds, Pioneer® #3394, Pioneer® #3573, and Pioneer® #65672 Honey & Pearl respectively. The experiment involved several trials of twenty seeds per trial sonicated at 20 kHz with a 13 mm probe, at an amplitude of 100%, in argon saturated tap water. The sonication time varied from 2 minutes to 10 minutes in 2 minute increments. Each groups of twenty seeds were placed in a 125 ml glass beaker packed in ice. By comparison, the soaking portion of the experiments was performed on one group of twenty seeds for each of the above-identified hybrids. The soaking time was fixed at 10 minutes for each of the hybrids. FIG. 16 shows the total weight for the twenty seed groups for each of the varying hybrids, sonication time groups, and soaking groups. FIG. 16 shows the relative sonicated and soaked weight difference in absolute amount, and in relative terms for the entire seed groups. The relative percent water uptake reflects the weight gain as a percentage of the seed weight prior to sonication and soaking. The results allow for comparison of the relative amounts of water uptake for sonication over a variety of time periods for three different hybrids. In all cases, the uptake percentages for the sonicated seeds exceeded the uptake from soaking for the same hybrids.

FIG. 17 repeats the experiment described above and represented by the data shown in FIG. 16, except that an amplitude of 75% was used.

FIG. 18 shows that sonication promotes the uptake of a cresyl violet dye into corn seeds. Sonication facilitates the uptake of the dye into the corn seeds, and into the embryo of the seed. By contrast the control seeds show that soaking accomplishes only minimal uptake, which does not penetrate beyond the periphery of the seed. The results depicted in FIG. 18 demonstrate the effectiveness of the sonication method in introducing substances of differing molecular weights into seeds.

In a similar manner, FIG. 19 shows that the sonication process is also effective at introducing a toluidine blue stain into corn seeds. In this set of experiments sonication took place in two groups, with five trials per group, for a total time of 15 minutes per trial. The sonication solution contained 15 ml of water and 750 mg. of toluidine blue stain. After each trial the amount of stain absorbed was determined. After the five trials in each of the groups the total stain absorbed was calculated, and a percentage of stain uptake was calculated based on the amount of stain absorbed over the five trials as a percentage of the total amount of stain originally present. The procedure was repeated for two soaked groups each comprising five trials. FIG. 18 shows that the sonication process results in dramatically higher absolute and relative amounts of uptake of the toluidine blue stain.

The experiments described below were conducted with the apparatus 100, rather than the apparatus 10 used above. FIG. 21 shows the results of an experiment conducted with Pioneer® #3394 corn seed hybrid. The experiment involved six groups of one seed each soncicated for 1, 2, 4, 6, 8, and 10 minutes in tap water saturated with 5 ml. of argon, at 30% amplitude in a polypropylene tube suspended in a cup horn 130 with cold water circulation. Each of the six groups represents the results of twenty individual trials. In comparison, the same experiment was performed for the same time groups, twenty trials each, except that the seeds were soaked only. The weights in mg. were measured prior to sonication and soaking, and again afterwards. FIG. 21 shows the total weights for each of the different groups of twenty seeds, and the relative and absolute weight differences for the sonicated and soaked groups. The results of this experiment show that the apparatus 10, 100 produce similar results, and that the sonicated seeds exhibit superior uptake of the solution when compared to the soaked seeds.

FIG. 22 shows the results of an experiment conducted with Pioneer® #3394 corn seed hybrid. The experiment involved twenty trials with one seed per trial sonicated at 20 kHz, at an amplitude of 39%, for a period of 1 minute, in argon saturated tap water. The seeds were placed individually in a polypropylene tube suspended in a large cup horn 130 with cold water circulation. By comparison, twenty Pioneer® #3394 corn hybrid seeds were soaked in argon-saturated tap water for a period of 1 minute. The weight in mg. of each of the seeds was measured prior to sonication and soaking, and measured again after sonication and soaking. FIG. 22 shows the relative sonicated and soaked weight difference in absolute amount, and in relative terms. The relative percent water uptake reflects the weight gain as a percentage of the seed weight prior to sonication and soaking. The mean and standard deviation across the entire experiment is reflected in the last lines of the table depicted in FIG. 22, and shows clearly the enhanced uptake of water into the seeds due to the sonication process.

FIG. 23 shows the results of an experiment identical to the experiment described above and represented by the data shown in FIG. 22, except that the time was extended from 1 minute to 2 minutes.

FIG. 24 shows the results of an experiment identical to the experiment described above and represented by the data shown in FIG. 22, except that the time was extended from 1 minute to 4 minutes.

FIG. 25 shows the results of an experiment identical to the experiment described above and represented by the data shown in FIG. 22, except that the time was extended from 1 minute to 6 minutes.

FIG. 26 shows the results of an experiment identical to the experiment described above and represented by the data shown in FIG. 22, except that the time was extended from 1 minute to 8 minutes.

FIG. 27 shows the results of an experiment identical to the experiment described above and represented by the data shown in FIG. 22, except that the time was extended from 1 minute to 10 minutes.

The series of experiments depicted in FIGS. 22–27 demonstrates the response to uptake over time for sonicated and soaked groups of seed, and again demonstrates the superiority of the sonication process. In principle, the overall impact of the above experiments demonstrates the ability of the imbibition process to uptake a variety of substances into seeds of a variety of different plants. As a result, introduction of any number of substances capable of imparting growth enhancing characteristics to a plant can be affected through the imbibition process of the present invention.

As is demonstrated in more detail in the commonly owned co-pending U.S. patent application Ser No. 08/886,901 filed Jul. 2, 1997 entitled METHOD FOR ENHANCING GERMINATION, incorporated herein by reference, the enhanced growth characteristic should continue to effect the seed and resultant plant for extended periods of time. Enhanced germination effects continue to manifest in sonicated seeds after periods of extended drying down and rehydration.

Although the invention has been described with respect to a preferred embodiment thereof, it is to be also understood that it is not to be sole limited since changes and modifications can be made therein which are within the full intended scope of this invention as defined by the appended claims.

We claim:

1. An imbibition process for the uptake of a substance into a seed, comprising the steps of:
    a) immersing said seed in a liquid solution that includes a dissolved gas and a pesticide capable of enhancing a growth characteristic of said seed;
    b) introducing into said liquid sound energy at a frequency and energy density sufficient to create cavitation in said liquid; and
    c) sonicating said seed for a period of time sufficient to result in an improved rate of uptake of said pesticide into said seed.

2. The invention in accordance with claim 1 wherein said pesticide comprises an insecticide.

3. The invention in accordance with claim 1 wherein said pesticide comprises a herbicide.

4. The invention in accordance with claim 1 wherein said pesticide comprises a fungicide.

\* \* \* \* \*